United States Patent
Hino

(10) Patent No.: US 10,434,858 B2
(45) Date of Patent: *Oct. 8, 2019

(54) ELECTRIC POWER SUPPLY SYSTEM, CONTROL DEVICE, VEHICLE, AND ENGINE GENERATOR UNIT FOR DRIVING VEHICLE

(71) Applicant: YAMAHA HATSUDOKI KABUSHIKI KAISHA, Iwata-shi, Shizuoka (JP)

(72) Inventor: Haruyoshi Hino, Iwata (JP)

(73) Assignee: YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,537

(22) Filed: May 5, 2017

(65) Prior Publication Data

US 2017/0244349 A1     Aug. 24, 2017

Related U.S. Application Data

(63) Continuation-in-part of application No. PCT/JP2015/082929, filed on Nov. 24, 2015.

(30) Foreign Application Priority Data

Nov. 25, 2014 (JP) .................................. 2014-237372
Oct. 2, 2015 (JP) .................................. 2015-196667
(Continued)

(51) Int. Cl.
*H02P 9/40*          (2006.01)
*B60K 1/02*          (2006.01)
(Continued)

(52) U.S. Cl.
CPC .................. *B60K 1/02* (2013.01); *B60K 1/00* (2013.01); *B60K 6/20* (2013.01); *B60K 6/26* (2013.01);
(Continued)

(58) Field of Classification Search
CPC ................................... H02P 9/40; B60L 11/08
See application file for complete search history.

(56) References Cited

U.S. PATENT DOCUMENTS

| 3,229,138 | A | | 1/1966 | Kober | |
|---|---|---|---|---|---|
| 5,763,977 | A | * | 6/1998 | Shimasaki | ........... H02K 21/024 310/162 |

(Continued)

FOREIGN PATENT DOCUMENTS

| CN | 1762086 A | 4/2006 |
|---|---|---|
| CN | 1836962 A | 9/2006 |

(Continued)

*Primary Examiner* — Sean Gugger
(74) *Attorney, Agent, or Firm* — Rabin & Berdo, P.C.

(57) ABSTRACT

An electric power supply system configured to supply electric power to an electrical load device in accordance with a current requirement. The electric power supply system includes an engine configured to output rotational power, a generator configured to receive the rotational power and to supply a current to the electrical load device. The generator includes a rotor, and a stator including a winding and a stator core with the winding wound thereon, a magnetic circuit for the winding passing through the stator core, and a supply current adjustment device configured to adjust magnetic resistance of the magnetic circuit for the winding, to thereby change an inductance of the winding to adjust the supplied current. The electric power supply system further includes a control device configured to control the engine to adjust the output rotational power and to control the supply current adjustment device to adjust the inductance of the winding.

23 Claims, 9 Drawing Sheets

(30) Foreign Application Priority Data

| Oct. 2, 2015 | (JP) | 2015-196668 |
| Oct. 2, 2015 | (JP) | 2015-196669 |
| Oct. 2, 2015 | (JP) | 2015-196670 |

(51) Int. Cl.

| H02K 21/24 | (2006.01) |
|---|---|
| H02P 9/04 | (2006.01) |
| H02K 1/27 | (2006.01) |
| H02K 21/02 | (2006.01) |
| H02M 7/44 | (2006.01) |
| H02P 9/14 | (2006.01) |
| B60K 1/00 | (2006.01) |
| B60K 6/20 | (2007.10) |
| B60K 6/26 | (2007.10) |
| B60W 20/50 | (2016.01) |
| G07C 5/00 | (2006.01) |
| G07C 5/08 | (2006.01) |
| H02K 7/18 | (2006.01) |
| B60W 20/19 | (2016.01) |
| B60W 10/06 | (2006.01) |
| B60W 10/08 | (2006.01) |
| B60W 20/00 | (2016.01) |
| H02K 7/00 | (2006.01) |
| B60L 50/10 | (2019.01) |
| B60L 50/13 | (2019.01) |
| B60L 50/14 | (2019.01) |
| B60L 50/61 | (2019.01) |
| B60K 6/24 | (2007.10) |
| B60K 6/48 | (2007.10) |
| H02P 101/45 | (2016.01) |
| B60K 6/34 | (2007.10) |
| B60K 6/46 | (2007.10) |
| H02P 27/06 | (2006.01) |
| H02P 101/25 | (2016.01) |

(52) U.S. Cl.

CPC .............. *B60L 50/10* (2019.02); *B60L 50/13* (2019.02); *B60L 50/14* (2019.02); *B60L 50/61* (2019.02); *B60W 10/06* (2013.01); *B60W 10/08* (2013.01); *B60W 20/00* (2013.01); *B60W 20/19* (2016.01); *B60W 20/50* (2013.01); *G07C 5/006* (2013.01); *G07C 5/008* (2013.01); *G07C 5/0825* (2013.01); *H02K 1/27* (2013.01); *H02K 7/006* (2013.01); *H02K 7/1815* (2013.01); *H02K 21/021* (2013.01); *H02K 21/026* (2013.01); *H02K 21/028* (2013.01); *H02K 21/029* (2013.01); *H02K 21/24* (2013.01); *H02M 7/44* (2013.01); *H02P 9/04* (2013.01); *H02P 9/14* (2013.01); *H02P 9/40* (2013.01); *B60K 6/24* (2013.01); *B60K 6/34* (2013.01); *B60K 6/46* (2013.01); *B60K 6/48* (2013.01); *B60K 2001/001* (2013.01); *B60L 2220/14* (2013.01); *B60L 2220/50* (2013.01); *B60L 2240/429* (2013.01); *B60W 2300/365* (2013.01); *B60W 2510/083* (2013.01); *B60W 2520/105* (2013.01); *B60W 2710/0644* (2013.01); *B60W 2710/08* (2013.01); *B60W 2710/083* (2013.01); *B60W 2720/106* (2013.01); *B60Y 2200/92* (2013.01); *H02P 27/06* (2013.01); *H02P 2101/25* (2015.01); *H02P 2101/45* (2015.01); *Y02T 10/6217* (2013.01); *Y02T 10/641* (2013.01); *Y02T 10/642* (2013.01); *Y02T 10/7005* (2013.01); *Y02T 10/7077* (2013.01); *Y10S 903/905* (2013.01); *Y10S 903/906* (2013.01); *Y10S 903/93* (2013.01)

(56) References Cited

U.S. PATENT DOCUMENTS

| 6,057,622 | A | * | 5/2000 | Hsu | H02K 21/046 |
|---|---|---|---|---|---|
|  |  |  |  |  | 310/155 |
| 6,072,258 | A | * | 6/2000 | Lamb | H02K 49/046 |
|  |  |  |  |  | 310/103 |
| 6,943,531 | B2 |  | 9/2005 | Fukaya |  |
| 7,064,454 | B2 |  | 6/2006 | Fukaya et al. |  |
| 7,204,011 | B2 |  | 4/2007 | Maslov |  |
| 8,288,982 | B2 |  | 10/2012 | Kauppi |  |
| 8,761,981 | B2 |  | 6/2014 | Hussain et al. |  |
| 2002/0170757 | A1 |  | 11/2002 | Kitada et al. |  |
| 2002/0193923 | A1 |  | 12/2002 | Toyama et al. |  |
| 2006/0152104 | A1 |  | 7/2006 | Hino et al. |  |
| 2007/0029887 | A1 |  | 2/2007 | Murota et al. |  |
| 2007/0096581 | A1 | * | 5/2007 | Zepp | H02K 21/024 |
|  |  |  |  |  | 310/191 |
| 2007/0227792 | A1 | * | 10/2007 | Yonemori | B60K 6/26 |
|  |  |  |  |  | 180/65.31 |
| 2009/0134723 | A1 | * | 5/2009 | Takeuchi | H02K 21/026 |
|  |  |  |  |  | 310/48 |
| 2009/0206602 | A1 | * | 8/2009 | Nakamura | H02K 7/12 |
|  |  |  |  |  | 290/43 |
| 2009/0212728 | A1 |  | 8/2009 | Yagi et al. |  |
| 2010/0131139 | A1 |  | 5/2010 | Sakai et al. |  |
| 2011/0121676 | A1 |  | 5/2011 | Zhu et al. |  |
| 2011/0133592 | A1 |  | 6/2011 | Hino et al. |  |
| 2011/0202219 | A1 |  | 8/2011 | Ishibashi |  |
| 2011/0246010 | A1 |  | 10/2011 | de la Torre Bueno |  |
| 2012/0126740 | A1 | * | 5/2012 | Kauppi | H02K 21/028 |
|  |  |  |  |  | 318/538 |
| 2012/0197472 | A1 |  | 8/2012 | He et al. |  |
| 2013/0096745 | A1 |  | 4/2013 | Hussain et al. |  |
| 2013/0127244 | A1 |  | 5/2013 | Handa |  |

FOREIGN PATENT DOCUMENTS

| CN | 103503277 A | 1/2014 |
|---|---|---|
| EP | 1132251 A1 | 9/2001 |
| EP | 1615319 A1 | 1/2006 |
| EP | 1705784 A2 | 9/2006 |
| EP | 1859985 A2 | 11/2007 |
| EP | 1993187 A1 | 11/2008 |
| JP | 2002-345109 A | 11/2002 |
| JP | 2003-306183 A | 10/2003 |
| JP | 2006-271040 A | 10/2006 |
| JP | 2007-195334 A | 8/2007 |
| JP | 2008-048519 A | 2/2008 |
| JP | 2008-285011 A | 11/2008 |
| JP | 2009-195051 A | 8/2009 |
| JP | 2009-225656 A | 10/2009 |
| JP | 2011-092008 A | 5/2011 |
| JP | 2012-044792 A | 3/2012 |
| JP | 2013-180645 A | 9/2013 |
| JP | 2014-084034 A | 5/2014 |
| JP | 2014-108673 A | 6/2014 |
| TW | M358746 U1 | 6/2009 |
| TW | I345539 B | 7/2011 |
| TW | M421259 U1 | 1/2012 |
| TW | M421388 U | 1/2012 |
| TW | 2013-15627 A | 4/2013 |
| TW | I401858 B | 7/2013 |
| WO | WO 2014-054069 A1 | 4/2014 |

\* cited by examiner

ELECTRIC POWER SUPPLY SYSTEM, CONTROL DEVICE, VEHICLE, AND ENGINE GENERATOR UNIT FOR DRIVING VEHICLE

CROSS-REFERENCE TO RELATED APPLICATIONS

This is a continuation-in-part application of International Application PCT/JP2015/082929, filed on Nov. 24, 2015, which is based on, and claims priority to, Japanese Patent Application No. 2014-237372, filed on Nov. 25, 2014, and Japanese Patent Application Nos. 2015-196667, 2015-196668, 2015-196669 and 2015-196670, all filed on Oct. 2, 2015, the contents of which are incorporated herein by reference.

TECHNICAL FIELD

The present invention relates to an electric power supply system, a control device, a vehicle, and an engine generator device for driving a vehicle.

BACKGROUND ART

For example, Japanese Patent Application Laid-Open No. 2002-345109 ("JPA'109") shows a vehicle. The vehicle shown in JPA'109 is a hybrid vehicle. This vehicle includes an engine, an accelerator pedal, a first rotary electric machine, a second rotary electric machine, and a drive wheel. The first rotary electric machine is coupled to an output shaft of the engine. The first rotary electric machine functions mainly as a generator. The second rotary electric machine is electrically connected to the first rotary electric machine. The second rotary electric machine functions mainly as a motor. By a current flowing in the first rotary electric machine and the second rotary electric machine, power generation and power running are performed. The second rotary electric machine is coupled to the drive wheel of the vehicle.

In the vehicle as shown in JPA'109, a depression of the accelerator pedal depressed by a driver represents a request for acceleration of the vehicle. The vehicle as shown in JPA'109 is, if provided with an electronic-controlled throttle device, able to optionally adjust the amount of air taken in by the engine. The vehicle is, therefore, controlled in the following manner. A target output of the second rotary electric machine (motor) is determined based on the vehicle speed and the amount of depression of the accelerator pedal depressed by the driver. A target electric power to be generated by the first rotary electric machine (generator) is determined in accordance with the target output of the second rotary electric machine. A target output of the engine is determined in accordance with the target electric power to be generated. The amount of air taken in and the amount of fuel injected by the engine are controlled so as to achieve the target output. In this control, the first rotary electric machine is controlled in its generating electric power and the second rotary electric machine is controlled in its output. In a case where the vehicle as shown in JPA'109 is configured with its accelerator pedal mechanically coupled with its engine throttle, the electric power generated by the first rotary electric machine and the output of the second rotary electric machine are controlled in accordance with an actual output of the engine. In JPA'109, as described above, electric power (output) of the rotary electric machine is controlled so as to allow applications to various types of vehicles with different characteristics.

BRIEF SUMMARY OF THE INVENTION

In the vehicle as shown in JPA'109, for example, to increase a current to be supplied to the second rotary electric machine serving as the motor, a control is performed so as to increase the amount of air taken in and the amount of fuel injected by the engine. The rotation speed of the engine increases, and as a result, the voltage outputted from the first rotary electric machine functioning as the generator increases. Here, there has been a problem that the current outputted from the generator is less readily increased than the rotation speed of the generator is. Therefore, an attempt to increase the current outputted from the generator requires an excessive increase of the output power of the engine. This may decrease the fuel efficiency. Dealing with the voltage, which increases in response to the increase of the output power of the engine, may also decrease the fuel efficiency.

The present invention provides an electric power supply system, a control device, a vehicle, and an engine generator device for driving a vehicle that are able to make adjustment responsive to a requirement of increasing a current with suppression of a decrease in fuel efficiency.

In various embodiments, the present invention adopts the following configurations:

(1) An electric power supply system configured to supply electric power to an electrical load device that requires a current that can be variable, the electric power supply system comprising:

an engine that outputs rotational power, the engine including an engine output adjustment device that adjusts the rotational power;

a generator that receives the rotational power from the engine and supplies a current to the electrical load device, the generator including a rotor, a stator, and a supply current adjustment device, the rotor connected to the engine, the rotor including a permanent magnet, the stator arranged opposite to the rotor, the stator including a winding and a stator core with the winding wound thereon, the supply current adjustment device configured to adjust the current to be supplied to the electrical load device, the adjustment implemented by changing an inductance of the winding, the change implemented by changing a magnetic resistance of a magnetic circuit for the winding, which passes through the stator core; and a control device configured to, upon a requirement of increasing the current to be supplied to the electrical load device, control the current to be supplied to the electrical load device by controlling both the engine output adjustment device and the supply current adjustment device that adjusts the current by changing the inductance of the winding.

In the electric power supply system of (1), the engine output adjustment device adjusts the rotational power of the engine. In addition, the supply current adjustment device changes the magnetic resistance of the magnetic circuit for the winding of the generator, which passes through the stator core. Thus, the supply current adjustment device changes the inductance of the winding, to adjust the current to be supplied to the electrical load device.

In the generator, the ratio of a current change to a voltage change obtained when changing the magnetic resistance of the magnetic circuit for the winding, which passes through the stator core, is different from the ratio of a current change to a voltage change obtained when changing the rotational power of the engine. For example, a current change can be made larger relative to a voltage change by changing the magnetic resistance of the magnetic circuit for the winding, which passes through the stator core.

In the electric power supply system of (1), the control device controls both the engine output adjustment device and the supply current adjustment device. This is how the electric power supply system of (1) is able to increase the current to be supplied to the electrical load device while suppressing an excessive increase of the rotational power of the engine and an excessive increase of the voltage. In addition, the control device controls both the engine output adjustment device and the supply current adjustment device. This enables adjustment of the rotational power of the engine and adjustment of the inductance of the winding to be controlled in an integrated manner. Therefore, the engine output adjustment device and the supply current adjustment device are able to make adjustment for increasing the current to be supplied to the electrical load device while suppressing an excessive increase of the rotational power of the engine and an excessive increase of the voltage. Thus, a loss that may be caused by an excessive increase of the rotational power and an excessive increase of the voltage can be suppressed. Accordingly, the electric power supply system of (1) is able to make adjustment responsive to a requirement of increasing the current, with suppression of a decrease in fuel efficiency.

(2) The electric power supply system of (1), wherein the magnetic circuit for the winding, which passes through the stator core, includes at least one non-magnetic gap, and the supply current adjustment device adjusts the current to be supplied to the electrical load device, the adjustment implemented by changing the inductance of the winding, the change implemented by changing a magnetic resistance of a non-magnetic gap being among the at least one non-magnetic gap, the non-magnetic gap existing between the winding and the rotor.

In the configuration of (2), the supply current adjustment device changes the inductance of the winding by changing the magnetic resistance of the non-magnetic gap existing between the winding and the rotor. The permanent magnet moving along with rotation of the rotor causes an alternating magnetic field to occur between the winding and the rotor. For example, reducing the magnetic resistance of the non-magnetic gap existing between the winding and the rotor leads to a reduction of an alternating magnetic field loss. This can increase the current relative to the rotational power supplied to the rotor. Accordingly, the current to be supplied to the electrical load device can be adjusted to an increased degree.

(3) The electric power supply system of (1) or (2), wherein the magnetic circuit for the winding, which passes through the stator core, includes at least one non-magnetic gap, and the supply current adjustment device adjusts the current to be supplied to the electrical load device, the adjustment implemented by changing the inductance of the winding, the change implemented by changing a magnetic resistance of a non-magnetic gap being among the at least one non-magnetic gap, the magnetic resistance of the non-magnetic gap is highest when the inductance of the winding is set to the highest settable value.

The configuration of (3) changes the magnetic resistance of the non-magnetic gap whose magnetic resistance is highest when the inductance of the winding is set to the highest settable value. This makes it easy to increase the amount of change of the inductance of the winding. Accordingly, the current can be adjusted to an increased degree.

(4) The electric power supply system of any one of (1) to (3), wherein the supply current adjustment device adjusts the supply current by changing the inductance of the winding such that the change rate of a magnetic flux linked with the winding is lower than the change rate of the inductance of the winding, the change implemented by changing the magnetic resistance of the magnetic circuit for the winding, which passes through the stator core, in accordance with a control performed by the control device.

In the configuration of (4), the supply current adjustment device changes the inductance of the winding such that the change rate of the magnetic flux linked with the winding is lower than the change rate of the inductance of the winding. The magnetic flux linked with the winding is influential to the voltage and current. The inductance of the winding is influential mainly to the current. The supply current adjustment device is, therefore, able to adjust the supply current with the change rate of the voltage being lower than the change rate of the current. That is, the supply current adjustment device is able to adjust the current while less influenced by voltage constraints. Accordingly, the configuration of (4) is able to respond to a requirement of increasing the current, with further suppression of a decrease in fuel efficiency.

(5) The electric power supply system of any one of (1) to (4), wherein the supply current adjustment device adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the position of at least a portion of the stator core relative to the winding in accordance with a control performed by the control device.

In the configuration of (5), the supply current adjustment device changes the magnetic resistance of the magnetic circuit for the winding, which passes through the stator core, the change implemented by moving the position of at least a portion of the stator core relative to the winding. Thus, the inductance of the winding can be changed easily. Accordingly, the current to be supplied to the electrical load device is readily adjustable.

(6) The electric power supply system of (5), wherein the supply current adjustment device adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the position of the stator core relative to the winding while maintaining the position of the stator core relative to the rotor in accordance with a control performed by the control device.

The configuration of (6) moves the position of the stator core relative to the winding while maintaining the position of the stator core relative to the rotor. This can suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused when the position of the stator core relative to the winding is moved. Accordingly, the configuration of (6) is able to respond to a requirement of increasing the current, with further suppression of a decrease in fuel efficiency.

(7) The electric power supply system of any one of (1) to (5), wherein the supply current adjustment device adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the winding in accordance with a control performed by the control device.

The configuration of (7) moves the position of the winding relative to the stator core while maintaining the position of the stator core relative to the rotor. This can suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused when the position of the stator core relative to the winding is moved. Accordingly, the configuration of (7) is able to respond to a requirement of increasing the current, with further suppression of a decrease in fuel efficiency.

(8) The electric power supply system of any one of (1) to (5), wherein the generator includes a supply voltage adjustment device that adjusts a voltage to be supplied to the electrical load device, the adjustment implemented by changing an induced voltage of the winding, the change implemented by changing a linkage flux flowing from the permanent magnet of the rotor and linked with the winding.

The configuration of (8) is able to adjust the voltage outputted from the generator in a way other than by the engine output adjustment device adjusting the rotational power. This provides an increased degree of freedom in terms of controlling, with suppression of a decrease in fuel efficiency.

(9) The electric power supply system of any one of (1) to (5), wherein the stator core includes a plurality of first stator core parts and a second stator core part, each of the plurality of first stator core parts having a facing portion that is opposite to the rotor with a non-magnetic gap therebetween, the second stator core part not having the facing portion, and the supply current adjustment device changes the magnetic resistance of the magnetic circuit for the winding, which passes through the stator core, the change implemented by moving one of the plurality of first stator core parts and the second stator core part relative to the other in accordance with a current requirement of the electric power supply system.

In the configuration of (9), the supply current adjustment device moves one of the plurality of first stator core parts and the second stator core part included in the stator core relative to the other. Such a configuration provides a larger change of the magnetic resistance of the magnetic circuit for the winding, which passes through the stator core, as compared with a configuration in which, for example, one of the stator core and a member different from the stator core is moved relative to the other. Thus, the current to be supplied to the electrical load device can be adjusted over a wider range in accordance with a current requirement of the electric power supply system. Accordingly, the configuration of (9) is able to respond to a requirement of increasing the current over a wider range, with further suppression of a decrease in fuel efficiency.

(10) The electric power supply system of (9), wherein the supply current adjustment device changes the magnetic resistance of the magnetic circuit for the winding, which passes through the stator core, the change implemented by moving one of the plurality of first stator core parts and the second stator core part relative to the other so as to shift from a first state to a second state, the first state being a state in which the length of a non-magnetic gap between each of the plurality of first stator core parts and the second stator core part is shorter than the length of a non-magnetic gap between adjacent ones of the plurality of first stator core parts, the second state being a state in which the length of the non-magnetic gap between each of the plurality of first stator core parts and the second stator core part is longer than the length of the non-magnetic gap between adjacent ones of the plurality of first stator core parts.

In the configuration of (10), in the first state, the length of the non-magnetic gap between each of the plurality of first stator core parts and the second stator core part is shorter than the length of a non-magnetic gap between adjacent ones of the plurality of first stator core parts. In the second state, the length of the non-magnetic gap between each of the plurality of first stator core parts and the second stator core part is longer than the length of a non-magnetic gap between adjacent ones of the plurality of first stator core parts.

In the first state, therefore, a portion of the magnetic flux generated by the current in the winding, which portion flows through the non-magnetic gap between the adjacent first stator core parts, flows mainly through the non-magnetic gap between the first stator core part and the second stator core part. That is, the magnetic flux generated by the current in the winding flows mainly through both the adjacent first stator core parts and the second stator core part. In the second state, the magnetic resistance of the magnetic circuit passing through the first stator core part is higher. The magnetic resistance of the magnetic circuit for the winding, which passes through the stator core, is changed more largely. Accordingly, the configuration of (10) is able to respond to a requirement of further increasing the current, with further suppression of a decrease in fuel efficiency.

(11) A control device for use in the electric power supply system of any one of (1) to (10), the control device connected to the engine output adjustment device and the supply current adjustment device, the control device comprising:

a current request receiving device configured to receive a current request that represents a requirement of a current to be supplied to the electrical load device; and an adjustment control device configured to, when the current request received by the current request receiving device is a requirement of increasing the current to be supplied to the electrical load device, control the current to be supplied to the electrical load device by controlling both the engine output adjustment device and the supply current adjustment device.

The control device of (11) is able to control the electric power supply system so as to respond to a requirement of increasing the current with suppression of a decrease in fuel efficiency.

(12) A vehicle comprising:

the electric power supply system of any one of (1) to (10);

a motor operable based on electric power supplied from the electric power supply system, the motor serving as the electrical load device; and a driving member that is driven by the motor, to drive the vehicle.

In the vehicle of (12), the requirement of the current to be supplied from the electric power supply system to the motor varies depending on the status of traveling of the vehicle. If an increase of the current to be supplied to the motor is required, the electric power supply system is able to respond to the requirement of increasing the current with suppression of a decrease in fuel efficiency. Accordingly, the vehicle of (12) is able to deal with a change of the status of traveling of the vehicle, with suppression of a decrease in fuel efficiency.

(13) An engine generator device for driving a vehicle, comprising:

the electric power supply system of any of (1) to (10); and a connector connectable to a vehicle connector provided in the vehicle, to relay a current that is supplied from the generator to a motor serving as the electrical load device, the engine, the generator, and the control device integrally mounted to the vehicle in a dismountable manner.

The engine generator device for driving a vehicle of (13) can be easily mounted to and dismounted from the vehicle. This makes it easy to perform a maintenance operation of the device that is able to respond to a requirement of increasing the current in accordance with the status of driving of the vehicle with suppression of a decrease in fuel efficiency. In addition, the engine generator device can be easily transferred to a vehicle of another type having a structure capable of storing the engine generator device therein. One engine generator device is mountable to a plurality of different vehicles in different time zones. That is, one engine generator device can be shared among a plurality of vehicles.

(14) A vehicle comprising:

the engine generator device for driving a vehicle of (13);

a storage part that stores the engine generator device for driving a vehicle;

the vehicle connector connectable to the connector;

a motor operable based on electric power supplied from the electric power supply system, the motor serving as the electrical load device; and a driving member that is driven by the motor, to drive the vehicle.

In the vehicle of (14), mounting and dismounting of the engine generator device is easy. Therefore, maintenance of the vehicle is easy. In addition, one engine generator device is mountable to a plurality of different vehicles in different time zones. That is, one engine generator device can be shared among a plurality of vehicles.

Advantageous Effects of Invention

The present invention is able to make adjustment responsive to a requirement of increasing a current with suppression of a decrease in fuel efficiency.

DETAILED DESCRIPTION OF THE INVENTION

Figure 1:
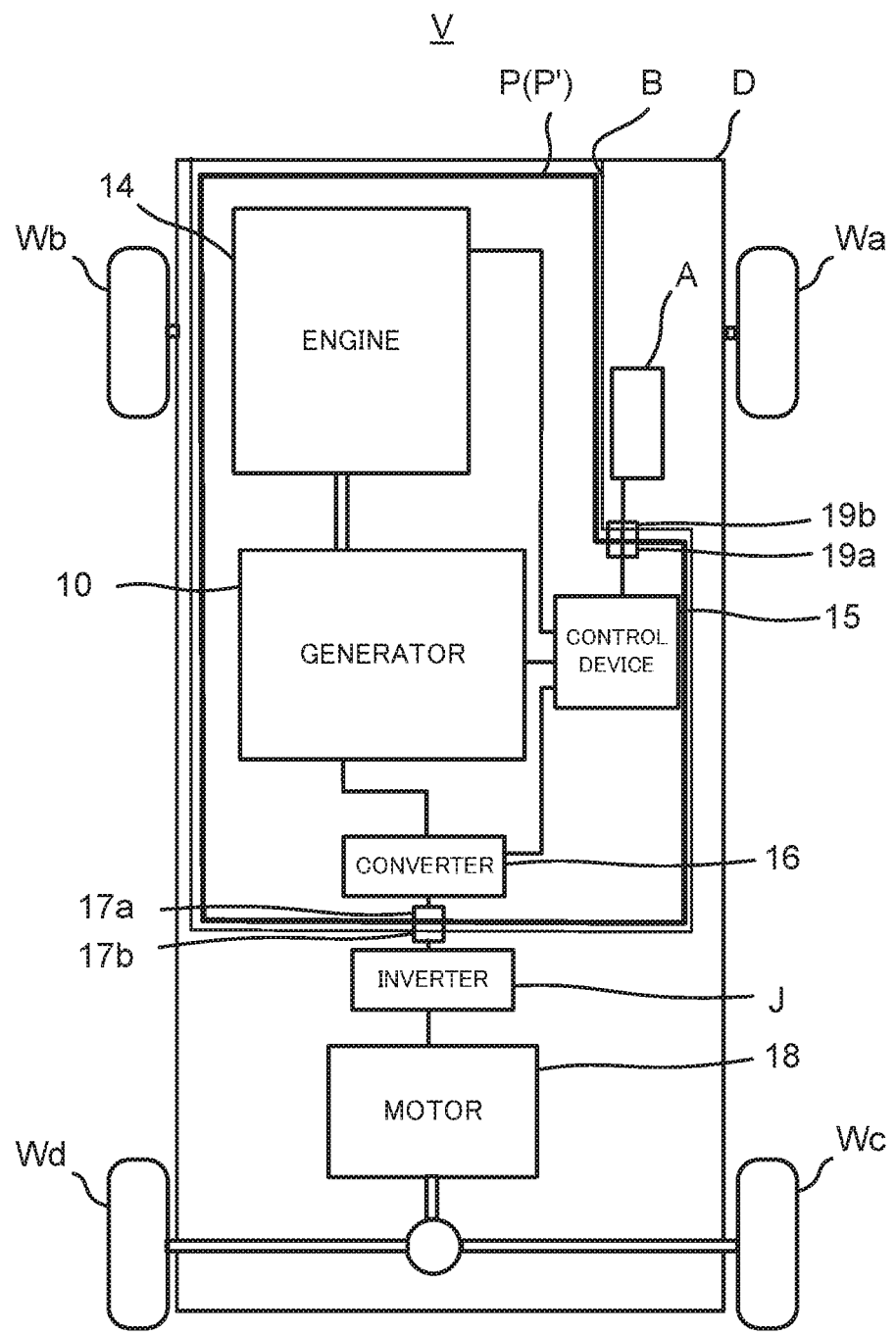
FIG. 1 is a block diagram showing an outline configuration of an apparatus having mounted thereon an electric power supply system according to a first embodiment of the present invention.

Studies conducted by the present inventor about an electric power supply system that responds to a requirement of increasing a current will be described.

In the vehicle as shown in JPA'109, the second rotary electric machine serving as the motor requires a supply of a high voltage when, for example, rotating at a high speed. The vehicle increases the amount of air taken in and the amount of fuel injected by the engine. Thus, the vehicle increases the voltage to be supplied from the first rotary electric machine serving as the generator to the second rotary electric machine.

When an increase of the current to be supplied to the motor is required, the vehicle as shown in JPA'109 increases the amount of air taken in and the amount of fuel injected by the engine. A situation requiring an increase of the current to be supplied to the motor occurs in a sudden acceleration or uphill traveling, for example. The rotation speed of the engine increases, and thus the voltage outputted from the generator increases. An increase of a power generation voltage causes an increase of a power generation current of the generator.

The power generation current flows in a winding. The power generation current is impeded by the impedance of the winding. The impedance can be expressed as the product $\omega L$ of the inductance of the winding of the generator and the angular velocity of rotation. As the rotation speed of the engine increases, the impedance of the winding which impedes the power generation current increases.

In the vehicle as shown in JPA'109, therefore, an attempt to increase the power generation current of the generator results in a greater increase of rotational power of the engine as compared with an increase of the power generation current. This can lead to an increased loss.

In the vehicle as shown in JPA'109, moreover, an attempt to increase the power generation current of the generator results in a greater increase of the voltage of the generator as compared with an increase of the power generation current. An electrical component connected thereto needs to have a high breakdown voltage. An output current of the generator is precisely controlled by, for example, turning on/off switching elements that are arranged between the generator and the motor. The switching elements having a high breakdown voltage for withstanding the increased voltage have a high on-resistance. This leads to a decrease in efficiency due to a heat loss of the switching elements.

Hence, the vehicle shown in JPA'109 causes a decrease in fuel efficiency.

The present inventor made further studies on the above-described problems. As a result, the present inventor discovered that the reason why the above-described problems occur in the vehicle as shown in JPA'109 is that the output is controlled without distinction between the current and voltage so that the current and the voltage are highly interactive with each other.

For solving the above-described problems, the present inventor further made intensive studies.

It has been believed that an increase of a current outputted from a generator is caused mainly by an increase of a voltage, and this is not unique to the vehicle as shown in JPA'109. A voltage is increased by, for example, an increase of the rotation speed, an increase of a magnetic force, or an increase of the number of turns of a winding. A current reaches saturation as the rotation speed increases due to an armature reaction. The increase of the magnetic force or the increase of the number of turns of the winding leads to a size increase.

One conceivable way to increase the current outputted from the generator is reducing the armature reaction which is caused by an inductance. It however has been considered that reducing the inductance of a winding leads to reducing a linkage flux, which makes it difficult to increase the current.

The present inventor focused on a magnetic circuit. A magnetic circuit that influences the inductance is a magnetic circuit for a winding. The magnetic circuit for a winding is different from a magnetic circuit that extends from a magnet of a rotor and passes through a winding. The studies conducted by the present inventor were based on clear distinction between the magnetic circuit for a winding and the magnetic circuit that extends from a magnet of a rotor and passes through a winding. The present inventor consequently discovered that a large change of the inductance can be caused by changing the magnetic resistance of the magnetic circuit for a winding.

As a consequence, the present inventor obtained the following findings: in an electric power supply system, adjusting a current by changing the inductance of a winding in addition to adjusting the rotational power of an engine makes it possible to reduce interaction between the current and voltage. Reducing interaction between the current and voltage enables the current to be increased while maintaining a balance between the current and voltage.

An electric power supply system of the present invention is accomplished based on the findings above. In the electric power supply system of the present invention, an engine output adjustment device adjusts rotational power. A supply current adjustment device changes the magnetic resistance of a magnetic circuit for a winding, which passes through a stator core. In this way, the supply current adjustment device changes the inductance of the winding, thus adjusting a current to be supplied to an electrical load device. The ratio of a current change to a voltage change obtained when changing the magnetic resistance of the magnetic circuit for the winding, which passes through the stator core, is higher than that obtained when, for example, changing the rotation speed of a drive source. The electric power supply system of the present invention is, therefore, able to adjust the current with less interaction between the voltage change and the current change as compared with when, for example, not changing the inductance. Accordingly, the electric power supply system of the present invention is able to increase the current to be supplied to the electrical load device with suppression of an excessive increase of the rotational power and an excessive increase of the voltage as compared with when, for example, not changing the inductance. This leads to an improvement in the fuel efficiency of the engine. Also, an excessive increase of the voltage is suppressed. This allows adoption of a switching element with a low breakdown voltage. The switching element with a low breakdown voltage has a low resistance when it is ON. A heat loss is suppressed, and therefore high fuel efficiency can be obtained.

In the electric power supply system of the present invention, furthermore, a control device controls both the engine output adjustment device and the supply current adjustment device. Thus, adjustment of the rotational power of the engine and adjustment of the inductance of the winding are controlled in an integrated manner. This makes it easy to precisely adjust a timing for adjusting the rotational power of the engine and a timing for adjusting the inductance of the winding. Therefore, even in the process of adjustment responding to a requirement of increasing the current, an excessive increase of the rotational power of the engine and an excessive increase of the voltage can be suppressed. Upon a requirement of increasing the current to be supplied to the electrical load device, for example, the control device directs the engine output adjustment device to increase the rotational power of the engine while directing the supply current adjustment device to reduce the inductance of the winding. Even in the process of increasing the output current, an excessive increase of the rotational power and an excessive increase of the voltage can be suppressed. Thus, a high efficiency is obtained.

As described above, the electric power supply system of the present invention is able to respond to the requirement of increasing the current with suppression of a decrease in fuel efficiency.

In the following, the present invention will be described based on preferred embodiments and with reference to the drawings.

First Embodiment

FIG. 1 is a block diagram showing an outline configuration of an apparatus having mounted thereon an electric power supply system P according to a first embodiment of the present invention.

FIG. 1 shows a vehicle V as an example of the apparatus having mounted thereon the electric power supply system P. The vehicle V includes the electric power supply system P and a vehicle body D. The vehicle body D of the vehicle V includes wheels Wa, Wb, Wc, Wd, a request indication device A, a vehicle connector 17b, an inverter J, and a motor 18.

The motor 18 is connected to drive wheels Wc, Wd among the wheels Wa to Wd. The motor 18 drives the drive wheels Wc, Wd in rotation so that the vehicle V travels.

The motor 18 is operated by electric power that is supplied from the electric power supply system P. A request for each of the current and voltage to be supplied to the motor 18 varies depending on a situation where the vehicle V is traveling. For example, at a time of acceleration or uphill traveling of the vehicle V, a request for increasing the current to be supplied to the motor 18 is issued.

The motor 18 represents one example of the electrical load device of the present invention. The drive wheels Wc, Wd represent one example of a driving member of the present invention.

The electric power supply system P is a drive source of the vehicle V. The electric power supply system P includes a generator 10, an engine 14, a control device 15, and a converter 16. The electric power supply system P does not output mechanical power to the outside of the electric power supply system P. The electric power supply system P outputs electric power to the outside of the electric power supply system P. The electric power supply system P supplies electric power to the motor 18. Details of the electric power supply system P will be given later.

The request indication device A outputs a current request. The request indication device A has an accelerator operator.

More specifically, the request indication device A is operated by a driver of the vehicle V. The request indication device A accordingly outputs a request for acceleration of the vehicle V. The request for acceleration of the vehicle V corresponds to a torque for driving the drive wheels Wc, Wd. The request for acceleration of the vehicle V also serves as an output request requesting an output of the vehicle V. The output of the vehicle V corresponds to an output of the motor 18. The request for acceleration of the vehicle V corresponds to a request for an output torque of the motor 18. The output torque of the motor 18 corresponds to a current supplied to the motor 18.

The current request that the request indication device A outputs to the electric power supply system P corresponds to a requirement of a current to be supplied to the motor 18. That is, the current request that the request indication device A outputs to the electric power supply system P is a requirement of a current that the electric power supply system P outputs to the motor 18. The request indication device A outputs the current request to the electric power supply system P. To be precise, the request indication device A outputs a signal representing the request.

In this embodiment, the request indication device A outputs a current request and a voltage request to the electric power supply system P. For example, in a situation requesting mainly an increase of the output torque of the motor 18, an increase of the current is requested. For example, in a situation requesting mainly an increase of the rotation speed of the motor 18, an increase of the voltage is requested.

The electric power supply system P supplies a current to the motor 18 via the inverter J.

The inverter J supplies to the motor 18 a current for driving the motor 18. The motor 18 of this embodiment is a three-phase brushless motor. The inverter J converts a DC outputted from the electric power supply system P into a three-phase current with phases shifted by 120 degrees. The phases of the three-phase current correspond to the three phases of the three-phase brushless motor, respectively. The motor 18 is operated by electric power that is supplied from the electric power supply system P via the inverter J. The inverter J may be included in the motor 18.

For example, an induction motor or a stepper motor is adoptable as the motor 18. For example, a DC motor with brushes is also adoptable as the motor 18. In a case where the motor 18 is a DC motor, the inverter J is not provided.

[Electric Power Supply System]

Figure 2:
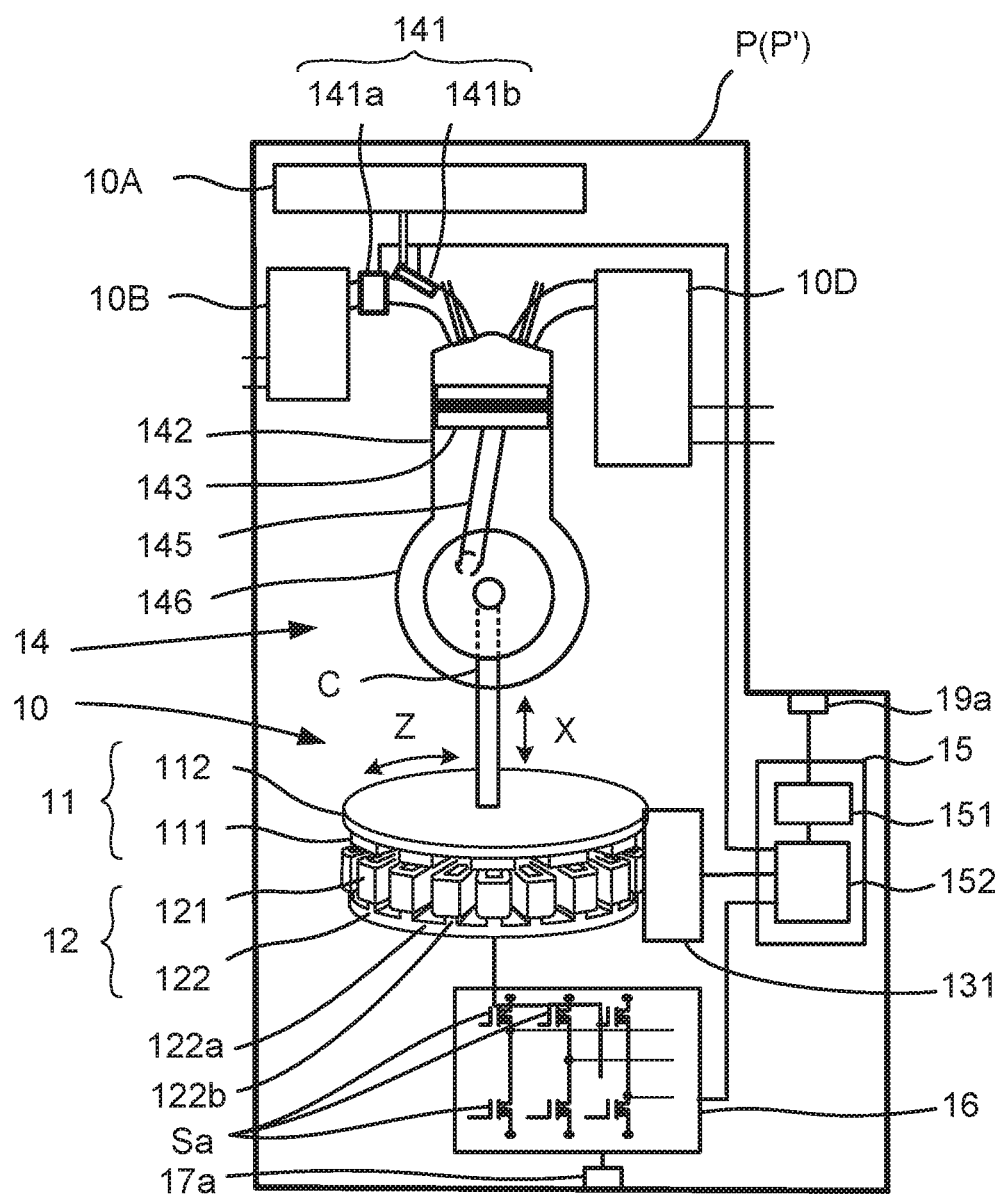
FIG. 2 is a system configuration diagram showing an outline configuration of the electric power supply system shown in FIG. 1.

FIG. 2 is a system configuration diagram showing an outline configuration of the electric power supply system P shown in FIG. 1.

The electric power supply system P of this embodiment constitutes an engine generator device P' for driving the vehicle. The vehicle body D of the vehicle V shown in FIG. 1 has a storage part B. The engine generator device P' is placed in the storage part B. The engine generator device P' for driving the vehicle can be mounted to and dismounted from the vehicle body D of the vehicle V (see FIG. 1).

The engine generator device P' for driving the vehicle includes the electric power supply system P, a connector 17*a*, and a control connector 19*a*. The electric power supply system P includes the generator 10, the engine 14, and the control device 15. The electric power supply system P also includes a fuel tank 10A, an air cleaner 10B, a muffler 10D, and the converter 16.

The generator 10, the engine 14, the control device 15, the connector 17*a*, the fuel tank 10A, the air cleaner 10B, the muffler 10D, and the converter 16 are integrally assembled. Accordingly, the engine 14, the control device 15, the connector 17*a*, the fuel tank 10A, the air cleaner 10B, the muffler 10D, and the converter 16, which form the engine generator device P', are integrally mounted to or dismounted from the vehicle body D of the vehicle V.

The engine generator device P' is an apparatus that is, as a physically single body, mounted to and dismounted from the vehicle body D. The engine generator device P' is configured such that all parts included in the engine generator device P' form a single body that is mountable to and dismountable from the vehicle body D. All parts included in the engine generator device P' are, for example, the generator 10, the engine 14, the control device 15, and the like. The engine generator device P' may be configured to be mounted to and dismounted from the vehicle body D without using a fixture member (e.g., a screw) that is attachable to and detachable from the vehicle body D and the engine generator device P'. For example, the engine generator device P' may be configured to be mounted to and dismounted from the vehicle body D by a mounting mechanism provided in the vehicle body D and/or the engine generator device P'. The engine generator device P' may be configured to be mounted to and dismounted from the vehicle body D with a fixture member that is attachable to and detachable from the vehicle body D and the engine generator device P'. The engine generator device P' may be configured such that a worker can perform an operation for mounting or dismounting the engine generator device P' by physically and directly operating the engine generator device P' with or without use of a tool. The engine generator device P' may be configured such that the operation for mounting or dismounting the engine generator device P' can be performed by machine equipment without a worker performing a direct and physical operation on the engine generator device P'. The engine generator device P' may be configured as a physically single body that is mountable to and dismountable from the vehicle body D and that has at least one component thereof individually mountable to and dismountable from the vehicle body D. The engine generator device P' may be configured such that it can be refueled while being mounted to the vehicle body D of the vehicle V. The engine generator device P' may be configured such that it can be refueled with an engine oil while being mounted to the vehicle body D of the vehicle V.

In a case of a failure of any component of the engine generator device P', the engine generator device P' can be dismounted from the vehicle V, for repair.

When the engine generator device P' is replaced, mechanism parts provided in the electric power supply system P are entirely replaced. This can reduce the need of an operation for connecting one portion of the mechanism parts to the remaining portion and adjusting them, which operation would be required when the one portion is replaced. This makes maintenance of the vehicle V easy.

The engine generator device P' can be easily transferred to an apparatus other than the vehicle V. For example, the engine generator device P' can be easily transferred to a vehicle of a different type than the vehicle V. Here, the vehicle of the different type has a structure capable of storing the engine generator device P' and includes a mating connector connectable with the connector 17a. For example, one engine generator device P' is shared among a plurality of types of vehicles.

For mounting the engine generator device P' to the vehicle body D of the vehicle V, the connector 17a is connected to the vehicle connector 17b (see FIG. 1) provided in the vehicle body D of the vehicle V. The connector 17a and the vehicle connector 17b relay the current supplied from the generator 10 of the electric power supply system P to the motor 18.

For mounting the engine generator device P' to the vehicle body D of the vehicle V, the control connector 19a is connected to a vehicle control connector 19b (see FIG. 1) provided in the vehicle body D of the vehicle V. The control connector 19a and the vehicle control connector 19b relay a signal representing the amount of operation supplied from the request indication device A to the control device 15 of the electric power supply system P. The control connector 19a may be integrated with the connector 17a.

The engine 14 is an internal combustion engine. The engine 14 causes fuel combustion. Thus, the engine 14 outputs mechanical power. The engine 14 includes an output shaft C. The output shaft C is, for example, a crankshaft. FIG. 2 schematically shows the connection relationship between the engine 14 and the output shaft C. The engine 14 includes a cylinder 142, a piston 143, a connecting rod 145, and a crank case 146. The cylinder 142 and the piston 143 define a combustion chamber. The piston 143 and the crankshaft serving as the output shaft C are connected via the connecting rod 145.

The engine 14 is supplied with air via the air cleaner 10B. The engine 14 is supplied with a fuel from the fuel tank 10A. The engine 14 causes the fuel supplied from the fuel tank 10A to combust in the combustion chamber, so that the piston 143 moves to-and-fro. The crankshaft serving as the output shaft C converts the to-and-fro movement into rotational power. The engine 14 outputs mechanical power through the output shaft C. An exhaust gas generated by the combustion in the engine 14 is discharged via the muffler 10D. The rotation speed of the output shaft C represents the rotation speed of the engine 14.

As for power transmission from the engine 14 to the drive wheels Wc, Wd (see FIG. 1), the engine 14 is not connected to the drive wheels Wc, Wd by any mechanical component. A mechanical system of the electric power supply system P is closed in the electric power supply system P. That is, all of the rotational power outputted from the engine 14 is converted into power other than mechanical power in the electric power supply system P. The rotational power generated by the engine 14 is converted exclusively into electric power. More specifically, all of the mechanical power generated by the engine 14 except a loss is converted into electric power by the generator 10. The electric power resulting from the conversion in the generator 10 is, in the outside of the electric power supply system P, converted into mechanical power by the motor 18.

The electric power supply system P does not directly drive an external mechanism arranged outside the electric power supply system P by using rotational power of the engine 14. Therefore, the control of the rotational power of the engine 14 is less influenced by constraints inherent in operation characteristics of the external mechanism. This provides a high degree of freedom in terms of controlling the rotational power of the engine 14.

The engine 14 includes an engine output adjustment device 141. The engine output adjustment device 141 adjusts the rotational power of the engine 14. The engine output adjustment device 141 includes a throttle valve adjustment mechanism 141a and a fuel injection device 141b. The throttle valve adjustment mechanism 141a adjusts the amount of air taken in by the engine 14. The fuel injection device 141b supplies the fuel to the engine 14. The engine output adjustment device 141 controls the amount of air taken in and the amount of fuel injected by the engine 14. In this manner, the engine output adjustment device 141 adjusts the rotational power outputted from the engine 14. For example, the engine output adjustment device 141 increases the amount of air taken in and the amount of fuel injected by the engine 14. This causes an increase of the rotational power of the engine 14. As the rotational power of the engine 14 increases, the rotation speed of the output shaft C increases. The rotation speed of the output shaft C represents the rotation speed of the engine 14.

The engine output adjustment device 141 changes the rotational power of the engine 14, thus adjusting the voltage and current generated by the generator 10.

As for power transmission from the engine 14 to the generator 10, the generator 10 is mechanically connected to the engine 14. The generator 10 is connected to the output shaft C of the engine 14. In this embodiment, the generator 10 is directly connected to the output shaft C. The generator 10 receives the rotational power from the engine 14, and supplies a current to the motor 18. The generator 10 is, for example, attached to the crank case 146 of the engine 14. Alternatively, for example, the generator 10 may be arranged in a position distant from the crank case 146.

The generator 10 includes a rotor 11, a stator 12, and a supply current adjustment device 131.

The generator 10 is a three-phase brushless generator. The rotor 11 and the stator 12 constitute a three-phase brushless generator.

The rotor 11 includes permanent magnets. To be more specific, the rotor 11 includes a plurality of magnetic pole parts 111 and a back yoke part 112. The magnetic pole part 111 is made of a permanent magnet. The back yoke part 112 is made of, for example, a ferromagnetic material. The magnetic pole parts 111 are arranged between the back yoke part 112 and the stator 12. The magnetic pole parts 111 are attached to the back yoke part 112. The plurality of magnetic pole parts 111 are arranged so as to align in a circumferential direction Z about the rotation axis of the rotor 11, that is, so as to align in the direction of rotation of the rotor 11. The plurality of magnetic pole parts 111 are arranged such that N-poles and S-poles alternate with respect to the circumferential direction Z. The generator 10 is a three-phase brushless generator of permanent magnet type. A winding for supplying a current is not provided on the rotor 11.

The stator 12 is arranged opposite to the rotor 11. The stator 12 includes a plurality of windings 121 and a stator core 122. The stator core 122 is made of, for example, a ferromagnetic material. The stator core 122 forms a magnetic circuit of the stator 12. The plurality of windings 121 are wound on the stator core 122. The stator core 122 includes a core main body 122*a* (see FIG. 3A) and a plurality of teeth 122*b*. The core main body 122*a* functions as a yoke. The plurality of teeth 122*b* extend from the core main body 122*a* toward the rotor 11. The plurality of teeth 122*b* protrude from the core main body 122*a* toward the rotor 11. The teeth 122*b* extending toward the rotor 11 have their distal end surfaces opposite to the magnetic pole parts 111 of the rotor 11 with an air gap therebetween. The teeth 122*b* of the stator core 122 and the magnetic pole parts 111 of the rotor 11 directly face each other. The plurality of teeth 122*b*, which are arranged at intervals with respect to the circumferential direction Z, align in the circumferential direction Z. Each of the plurality of windings 121 is wound on each of the plurality of teeth 122*b*. Each winding 121 is wound so as to pass through a slot between the plurality of teeth 122*b*. Each winding 121 corresponds to any of the three phases, namely, U-phase, V-phase, and W-phase. The windings 121 corresponding to U-phase, V-phase, and W-phase are arranged in order in the circumferential direction Z.

The rotor 11 is connected to the output shaft C of the engine 14. The rotor 11 is rotated along with rotation of the output shaft C. The rotor 11 has the magnetic pole parts 111 rotating in a state where the magnetic pole parts 111 are opposite to the teeth 122*b* of the stator core 122. As the rotor 11 rotates, magnetic fluxes linked with the windings 121 change. As a result, an induced voltage is generated in the windings 121. This is how the generator 10 performs power generation. The generator 10 supplies a generated current to the motor 18. The current outputted from the generator 10 is supplied to the motor 18. To be specific, the current outputted from the generator 10 is supplied to the motor 18 via the converter 16 and the inverter J. As the current outputted from the generator 10 increases, a current supplied from the converter 16 to the inverter J increases, so that a current supplied to the motor 18 increases. A voltage outputted from the generator 10 is supplied to the motor 18 via the converter 16 and the inverter J.

In this embodiment, the rotor 11 and the stator 12 have an axial gap structure. The rotor 11 and the stator 12 are opposite to each other with respect to the direction (axial direction) X of the rotation axis of the rotor 11. The plurality of teeth 122*b* included in the stator 12 protrude in the axial direction X from the core main body 122*a*. In this embodiment, the axial direction X is a direction in which the rotor 11 and the stator 12 are opposite to each other.

The supply current adjustment device 131 adjusts the current to be supplied from the generator 10 to the motor 18. For adjusting the current to be supplied to the motor 18, the supply current adjustment device 131 changes the inductance of the winding 121. The supply current adjustment device 131 changes the magnetic resistance of a magnetic circuit for the winding 121, which passes through the stator core 122. In this manner, the supply current adjustment device 131 changes the inductance of the winding 121. The supply current adjustment device 131 is a current adjustment mechanism. The magnetic circuit for the winding 121 is, for example, a close-loop circuit. The magnetic circuit for the winding 121 is a circuit that passes through an internal path of the winding 121, then goes out from one end portion (the end portion close to the rotor) of the internal path of the winding 121, then enters one end portion (the end portion close to the rotor) of an internal path of an adjacent winding 121, then passes through the internal path of the adjacent winding 121, then goes out from the other end portion (the end portion remote from the rotor) of the internal path of the adjacent winding 121, and then enters the other end portion (the end portion remote from the rotor) of the internal path of the winding 121. The internal path of the winding 121 is a path provided within the winding 121 so as to extend in the direction in which the rotor 11 and the stator 12 are opposite to each other. The magnetic circuit for the winding 121 partially has a non-magnetic gap such as an air gap. The magnetic circuit for the winding 121 is, for example, made up of the stator core 122 and a non-magnetic gap.

Details of the adjustment of the inductance made by the supply current adjustment device 131 will be given later.

The control device 15 of the electric power supply system P controls the current to be supplied to the motor 18 (see FIG. 1) serving as the electrical load device. Upon a requirement of increasing the current to be supplied to the motor 18, the control device 15 controls the current to be supplied to the motor 18. Upon a requirement of increasing power to be outputted to the motor 18 serving as the electrical load device, the control device 15 controls the current to be supplied to the motor 18.

The control device 15 is connected to the engine output adjustment device 141 and the supply current adjustment device 131. A current request issued to the electric power supply system P is outputted from the request indication device A in accordance with the amount of operation of the request indication device A. The control device 15 controls the engine output adjustment device 141 and the supply current adjustment device 131 in accordance with the current request outputted from the request indication device A.

The electric power supply system P of this embodiment adjusts a balance between the inductance of the generator 10 and the rotation of the engine 14 by means of the control device 15. Therefore, the vehicle body D (see FIG. 1) serving as the apparatus on which the electric power supply system P is mounted does not need to adjust the balance. The electric power supply system P is dealt with like a battery unit that receives the current request. The vehicle V having the electric power supply system P mounted thereon is able to obtain a current responsive to the request from the electric power supply system P, without the need of its built-in control device that directly controls the amount of air taken in and the amount of fuel injected by the engine 14.

The control device 15 includes a current request receiving device 151 and an adjustment control device 152.

The control device 15 is constituted of a microcontroller, for example. The control device 15 includes a central processing unit (not shown) and a storage device (not shown). The central processing unit performs computational processing based on a control program. The storage device stores data concerning programs and computation. The current request receiving device 151 and the adjustment control device 152 are implemented by the central processing unit executing programs.

The current request receiving device 151 receives a current request. The current request represents a requirement of the current to be supplied to the motor 18. The current request receiving device 151 receives a current request which is outputted in accordance with the amount of operation of the request indication device A.

The adjustment control device 152 controls the engine output adjustment device 141 and the supply current adjustment device 131. Thus, the adjustment control device 152 controls the current to be supplied to the motor 18.

If the current request received by the current request receiving device 151 is a requirement of increasing the current to be supplied to the motor 18, the adjustment control device 152 performs the control so as to increase the current to be supplied to the motor 18. That is, to increase output power of the motor 18, the adjustment control device 152 performs the control so as to increase the current to be supplied to the motor 18.

The electric power supply system P also includes the converter 16. The converter 16 rectifies the current outputted from the generator 10. The converter 16 converts a three-phase AC outputted from the generator 10 into a DC. The converter 16 outputs the DC. The converter 16 has an inverter circuit, for example. The converter 16 has a three-phase bridge inverter circuit, for example. The three-phase bridge inverter circuit includes switching elements Sa corresponding to the respective three phases. On/off operations of the switching elements Sa are controlled based on a signal supplied from a position sensor (not shown) that detects the rotation position of the rotor 11.

The operation of the converter 16 is controlled by the control device 15. The current to be supplied to the motor 18 can be adjusted by, for example, changing the timing for turning on/off the switching elements of the converter 16 relative to a predetermined phase angle in the three-phase AC. Even when the engine 14 and the generator 10 are in operation, the rotation of the motor 18 can be stopped by, for example, the converter 16 blocking the current generated by the generator 10. A stopped state of the vehicle V can be maintained in this manner.

The adjustment made by the converter 16 is mainly for limiting the current generated by the generator 10. The adjustment made by the converter 16 is different from controlling the current by changing the inductance of the generator 10. The following description will be given under the assumption that the limiting of the current made by the converter 16 is minimum.

It is also possible that the converter 16 has a bridge circuit including diodes. That is, the converter 16 may be configured as a rectifier. In such a case, the control of the current by the control device 15 is not performed.

[Supply Current Adjustment Device]

Figure 3A:
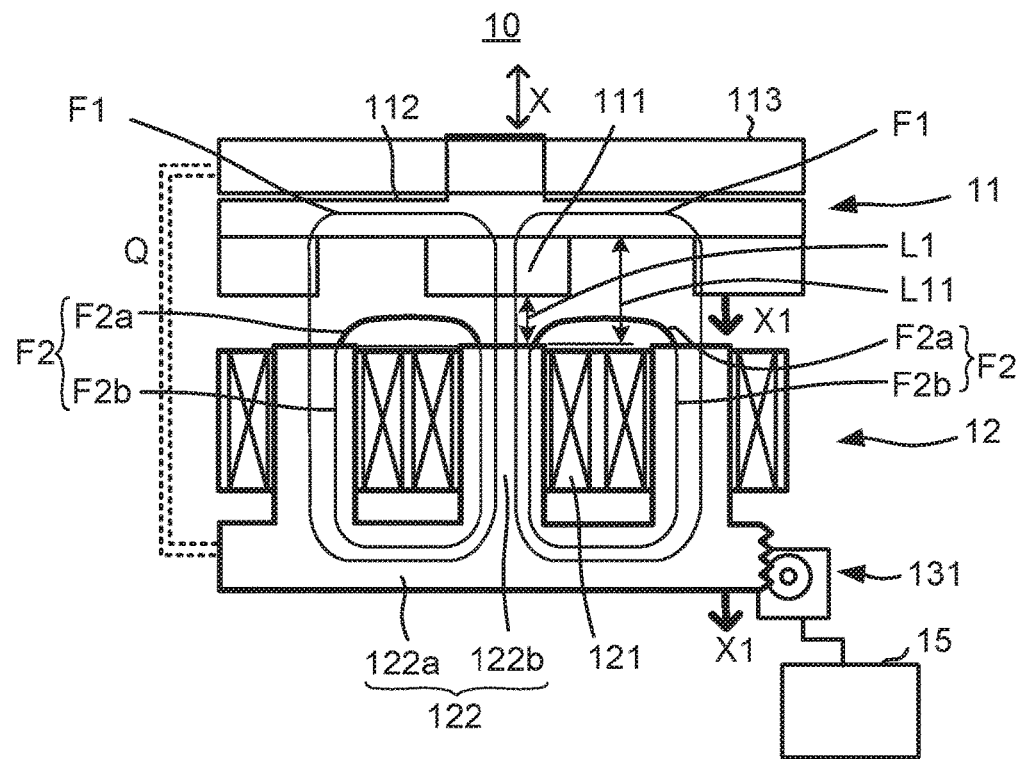
FIG. 3A is a schematic diagram for explanation of adjustment made by a supply current adjustment device included in a generator shown in FIG. 2.
Figure 3B:
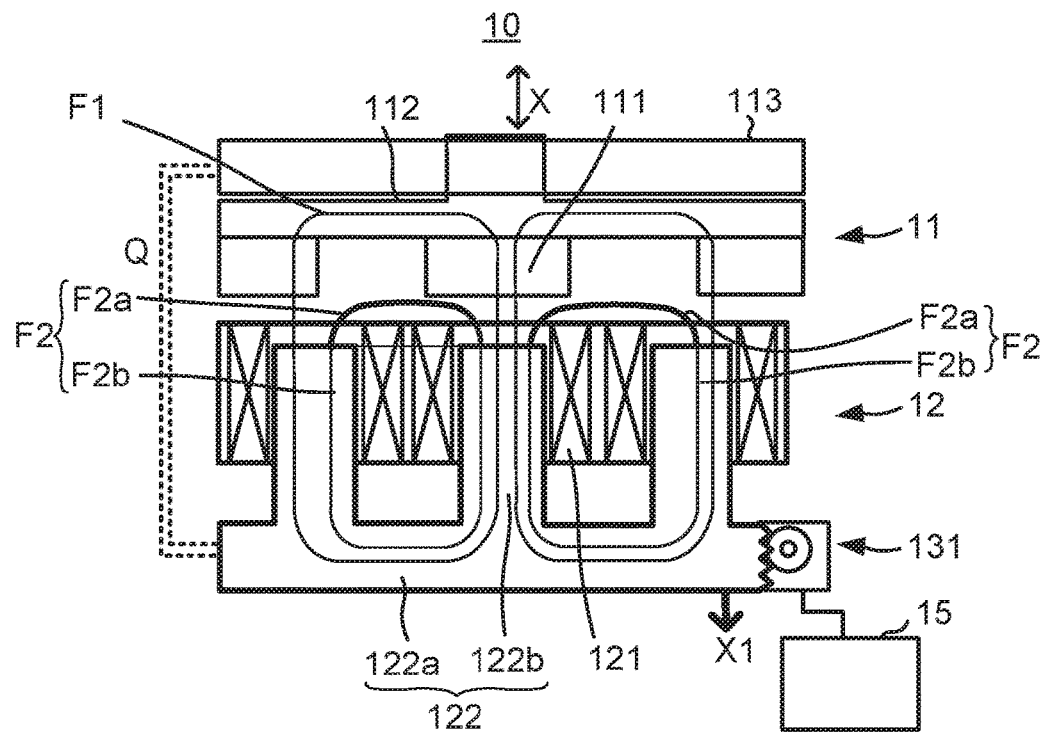
FIG. 3B is a schematic diagram showing a state in which the inductance of a winding is set lower than that of FIG. 3A.

FIG. 3A and FIG. 3B are schematic diagrams for explanation of adjustment made by the supply current adjustment device 131 provided in the generator 10 shown in FIG. 2. FIG. 3A shows a state in which the inductance of the winding 121 is set to the highest settable value. FIG. 3B shows a state in which the inductance of the winding 121 is set to a value lower than that of FIG. 3A.

FIG. 3A illustrates a part of the rotor 11 and a part of the stator 12 provided in the generator 10. The generator 10 of this embodiment includes an SPM (Surface Permanent Magnet) generator. The rotor 11 and the stator 12 are opposite to each other. More specifically, the magnetic pole parts 111 of the rotor 11 and the teeth 122b of the stator core 122 of the stator 12 are opposite to each other with the air gap therebetween. The magnetic pole parts 111 are exposed to the stator 12.

The supply current adjustment device 131 changes the magnetic resistance of a magnetic circuit F22 for the winding 121, which passes through the stator core 122. In this manner, the supply current adjustment device 131 changes the inductance of the winding 121, to adjust the current to be supplied to the motor 18. In more detail, the supply current adjustment device 131 moves the position of the stator core 122 relative to the winding 121. This is how the supply current adjustment device 131 changes the magnetic resistance of the magnetic circuit F22 for the winding 121, which passes through the stator core 122.

The windings 121 are secured to a casing (not shown) of the generator 10. The stator core 122 is supported on the casing such that the stator core 122 is freely movable in the axial direction X relative to the windings 121. The windings 121 are not secured to the teeth 122b. A gap is ensured between each winding 121 having a cylindrical shape and each tooth 122b. The gap is to such an extent that the tooth 122b is freely movable relative to the winding 121.

The supply current adjustment device 131 moves the stator core 122 so as to move the teeth 122b in a direction into and out of the cylindrically wound windings 121. In this embodiment, the supply current adjustment device 131 moves the stator core 122 in the axial direction X. The control device 15 operates the supply current adjustment device 131 in accordance with the current request.

In FIGS. 3A and 3B, for the purpose of describing the movement of the stator core 122 in an easy-to-understand manner, the supply current adjustment device 131 is schematically illustrated in the form of a rack-and-pinion mechanism and a motor. Here, mechanisms other than the illustrated one are adoptable as the supply current adjustment device 131 that moves the stator core 122. For example, a mechanism including a cylindrical member that is arranged concentric with a stator core and in threaded engagement with the stator core is adoptable. Such a mechanism is able to move the stator core in the axial direction X by, for example, rotating the cylindrical member relative to the stator core.

The supply current adjustment device 131 moves the position of the stator core 122 relative to the winding 121 while maintaining the position of the stator core 122 relative to the rotor 11. In FIGS. 3A and 3B, the broken lines Q express that the rotor 11 moves in conjunction with the stator core 122 in the axial direction X. A structure for maintaining the relative position between the rotor 11 and the stator core 122 is implemented by, for example, a bearing part 113 rotatably supporting the rotor 11. The position of the bearing part 113 is fixed relative to the stator core 122.

FIG. 3A and FIG. 3B illustrate primary magnetic fluxes F1 generated by the magnetic pole parts 111. The line of each magnetic flux F1 represents a primary magnetic circuit through which the magnetic flux F1 generated by the magnetic pole part 111 passes. The magnetic circuit through which the magnetic flux F1 passes will be referred to as a magnetic circuit F1.

The primary magnetic flux F1 generated by the magnetic pole part 111 flows through the magnetic pole part 111, the air gap between the magnetic pole part 111 and the tooth 122b, the tooth 122b, the core main body 122a, and the back yoke part 112. In other words, the magnetic circuit F1 is made up of the magnetic pole part 111, the air gap between the magnetic pole part 111 and the tooth 122b, the tooth 122b, the core main body 122a, and the back yoke part 112.

Here, FIG. 3A and FIG. 3B show three teeth 122b among the plurality of teeth 122b arranged in the circumferential direction. For providing plain illustration of the magnetic circuits F1, FIG. 3A and FIG. 3B show a state in which the magnetic pole part 111 is opposite to the middle tooth 122b among the three teeth 122b.

As the rotor 11 rotates, the amount of magnetic flux generated by the magnetic pole part 111 and linked with the winding 121 changes. The change of the amount of magnetic flux linked with the winding 121 causes an induced voltage to occur in the winding 121. That is, power is generated.

The induced voltage caused in the winding 121 depends on the amount of magnetic flux linked with the winding 121. The higher the magnetic resistance of the magnetic circuit F1 is, the smaller the amount of magnetic flux linked with the winding 121 is. The magnetic resistance of the magnetic circuit F1 depends mainly on the magnetic resistance of the air gap between the tooth 122b and the magnetic pole part 111. The magnetic resistance of the air gap between the tooth 122b and the magnetic pole part 111 depends on an air gap length L1 of the air gap between the tooth 122b and the magnetic pole part 111. Hereinafter, a length of a gap refers to a width of the gap.

Accordingly, the induced voltage caused in the winding 121 depends on the air gap length L1 of the air gap between the tooth 122b and the magnetic pole part 111.

FIG. 3A and FIG. 3B illustrate a primary magnetic flux F2 generated by a current flowing in the winding 121. At a time of power generation, a current caused by the induced voltage flows in the winding 121. The magnetic flux F2 is generated by the current flowing in the winding 121 at the time of power generation. The line of each magnetic flux F2 represents a primary magnetic circuit through which the magnetic flux F2 generated by the current in the winding 121 passes. The magnetic circuit through which the magnetic flux F2 passes will be referred to as a magnetic circuit F2. The magnetic circuit F2 is the magnetic circuit for the winding 121. The magnetic circuit F2 for the winding 121 is made up of a path passing through the inside of the winding 121 and providing the minimum magnetic resistance of the entire magnetic circuit F2.

The magnetic circuit F2 passes through the stator core 122. The magnetic circuit F2 passes through adjacent teeth 122b. In the drawing, three teeth 122b among the plurality of teeth 122b arranged in the circumferential direction are shown. The magnetic circuit F2 for the winding 121 wound on the middle tooth 122b among the three teeth 122b is illustrated as a typical example. A magnetic circuit F2 for a certain winding 121 passes through a tooth 122b having the certain winding 121 wound thereon and two teeth 122b adjacent to the certain tooth 122b.

The primary magnetic flux F2 generated by the current in the winding 121 passes through the teeth 122b, the core main body 122a, and the air gap between the two adjacent teeth 122b. In other words, the magnetic circuit F2 is made up of the teeth 122b, the core main body 122a, and the air gap between the two adjacent teeth 122b. The magnetic circuit F2 passing through the stator core 122 includes one air gap. A portion of the magnetic circuit F2 including the air gap is indicated by the bold line. The bold-line portion of the magnetic circuit F2 including the air gap will be simply referred to as an air gap F2a. The air gap F2a exists between the winding 121 and the rotor 11. The air gap F2a included in the magnetic circuit F2 exists between the winding 121 and the rotor 11 and between the adjacent teeth 122b. The air gap F2a is a non-magnetic gap. A portion of the magnetic circuit F2 corresponding to the air gap F2a is provided so as to connect respective portions of the two adjacent teeth 122b opposite to the rotor 11.

The magnetic circuit F2 for the winding 121 includes the air gap F2a between the two adjacent teeth 122b. The magnetic circuit F2 does substantially not include the back yoke part 112 of the rotor 11. Most of the magnetic flux F2 generated by the current in the winding 121 passes through the air gap between the two adjacent teeth 122b without going to the back yoke part 112 of the rotor 11, for the following reasons.

For the magnetic flux F2 generated by the current in the winding 121, the magnetic pole part 111 is considered simply as a magnetic flux path. In this embodiment, the magnetic pole part 111 is made of a permanent magnet whose magnetic permeability is as low as air. The magnetic pole part 111 can therefore be considered as equivalent to air for the magnetic circuit F2. Since the magnetic pole part 111 is equivalent to air, the substantial air gap length of the air gap between the stator 12 and the rotor 11 is equal to a distance L11 from the tooth 122b to the back yoke part 112. The distance L11 from the tooth 122b to the back yoke part 112 includes the thickness of the magnetic pole part 111 with respect to the axial direction X. Thus, the distance L11 is longer than a distance L1 from the tooth 122b to the magnetic pole part 111.

In this embodiment, moreover, the amount of the magnetic flux F2 generated by the current in the winding 121 is smaller than the amount of magnetic flux generated by the permanent magnet of the magnetic pole part 111. Most of the magnetic flux F2 generated by the current in the winding 121 is less likely to reach the back yoke part 112 across the air gap length L11. Little of the magnetic flux F2 generated by the current in the winding 121 passes through the back yoke part 112.

Thus, most of the magnetic flux F2 generated by the current in the winding 121 passes through the air gap F2a between the teeth 122b rather than through the back yoke part 112 of the rotor 11. In the state shown in FIG. 3A, the inductance of the winding 121 is set to the highest settable value. In the state shown in FIG. 3A, the air gap F2a included in the magnetic circuit F2 has the highest magnetic resistance among portions of the magnetic circuit F2. The air gap F2a has a higher magnetic resistance than that of a remaining portion F2b of the magnetic circuit F2 other than the air gap F2a.

The inductance of the winding 121 depends on the magnetic resistance of the magnetic circuit F2 for the winding 121. The inductance of the winding 121 is in reverse proportion to the magnetic resistance of the magnetic circuit F2 for the winding 121.

Here, the magnetic resistance of the magnetic circuit F2 for the winding 121 is the magnetic resistance of the magnetic circuit F2 through which the magnetic flux F2 generated by the current in the winding 121 flows. The magnetic resistance of the magnetic circuit F2 for the winding 121, which passes through the stator core 122, includes the magnetic resistance of the air gap F2a between the two adjacent teeth 122b. In a strict sense, the magnetic flux F2 generated by the current in the winding 121 passes through both the stator 12 and the rotor 11. As described above, however, most of the magnetic flux generated by the current in the winding 121 passes through the air gap F2a between the two adjacent teeth 122b without going to the back yoke part 112 of the rotor 11. Therefore, the magnetic resistance to the winding 121 depends more strongly on the magnetic resistance of the magnetic circuit F2 passing through the stator 12 than on the magnetic resistance of the magnetic circuit F1 passing through the rotor 11. That is, the inductance of the winding 121 depends more strongly on the magnetic resistance of the magnetic circuit F2, which passes through the stator core 122 when viewed from the winding 121 side, than on the magnetic resistance of the magnetic circuit F1, which passes through the rotor 11 when viewed from the winding 121 side. Accordingly, the inductance of the winding 121 substantially depends on the magnetic resistance of the magnetic circuit F2, which passes through the stator core 122 when viewed from the winding 121 side.

The supply current adjustment device 131 moves the position of the stator core 122 relative to the windings 121. In this manner, the supply current adjustment device 131 changes the magnetic resistance of the magnetic circuit F2 for the winding 121. This is how the supply current adjustment device 131 changes the inductance of the winding 121.

For example, in case of the supply current adjustment device 131 moving the stator core 122 in a direction indicated by the arrow X1, the teeth 122b of the stator core 122 are moved in the direction out of the cylindrically wound windings 121.

FIG. 3B shows a state having a lower inductance than that of the state shown in FIG. 3A.

Since the teeth 122b of the stator core 122 are moved out of the windings 121, the volume of the stator core 122 existing within the windings 121 is reduced. As a result, the magnetic flux within the winding 121 spreads. From the viewpoint of the magnetic circuit F2 for the winding 121, the length of the air gap F2a constituting the magnetic circuit F2 increases. This increases the magnetic resistance of the air gap F2a between the winding 121 and the rotor 11. That is, the magnetic resistance of the air gap F2a, whose magnetic resistance is highest, increases. As a result, the magnetic resistance of the magnetic circuit F2 for the winding 121, which passes through the stator core 122, increases. Consequently, the inductance of the winding 121 decreases.

The supply current adjustment device 131 changes the magnetic resistance of the air gap F2a whose magnetic resistance is highest. In this manner, the supply current adjustment device 131 changes the magnetic resistance of the magnetic circuit F2 passing through the adjacent teeth 122b. This can cause a larger change of the inductance of the winding 121 as compared with, for example, changing the magnetic resistance of a portion other than the air gap F2a.

Furthermore, the supply current adjustment device 131 changes the inductance of the winding 121 such that the change rate of the inductance of the winding 121 is higher than the change rate of the magnetic flux linked with the winding 121. This is how the supply current adjustment device 131 adjusts the current. The supply current adjustment device 131 of the generator 10 according to this embodiment moves the position of the stator core 122 relative to the windings 121 while maintaining the position of the stator core 122 relative to the rotor 11.

As the supply current adjustment device 131 moves the stator core 122 in the direction of the arrow X1, the rotor 11 is accordingly moved in the direction of the arrow X1. Therefore, the position of the stator core 122 relative to the rotor 11 is maintained. This can suppress a change of the air gap length L1 between the teeth 122b and the magnetic pole parts 111, which otherwise might be caused by movement of the stator core 122. Accordingly, a change of the magnetic flux F1 flowing from the magnetic pole part 111 to the stator core 122 is suppressed. That is, a change of the magnetic flux F1 linked with the winding 121 is suppressed.

Figure 4:
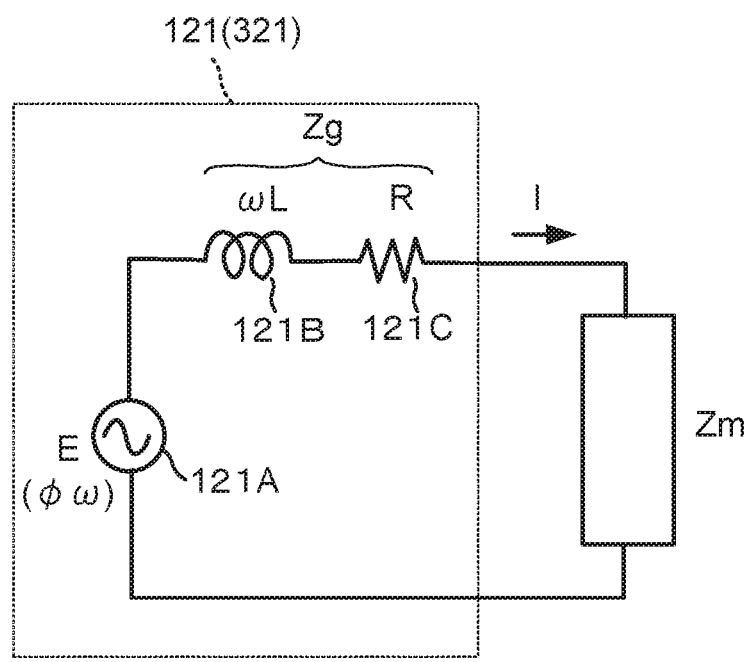
FIG. 4 is a circuit diagram schematically showing an equivalent circuit of a winding included in the generator shown in FIGS. 3A and 3B.

FIG. 4 is a circuit diagram schematically showing an equivalent circuit of the winding 121 of the generator 10 shown in FIG. 3A.

The circuit depicted in FIG. 4 is simplified for the purpose of outlining a change of the voltage and current generated by the generator 10. In addition, illustration of the converter 16 and the inverter J is omitted on the assumption that their states are fixed.

As shown in FIG. 4, the winding 121 in an electrical sense includes an AC voltage source 121A, an inductor 121B, and a resistance 121C.

The AC voltage source 121A outputs an induced voltage E which depends mainly on a magnetic flux $\Phi$ linked with the winding 121. More specifically, the induced voltage E depends on the product of the magnetic flux F1 and the rotation speed $\omega$ of the rotor 11. An inductance L of the inductor 121B depends mainly on the magnetic resistance of the magnetic circuit F2 for the winding 121, which passes through the stator core 122. A resistance value R of the resistance 121C is a winding resistance. Impedance Zg of the winding 121 is schematically expressed as $$((\omega L)^2 + R^2)^{1/2}.$$

The supply current adjustment device 131 moves the position of the stator core 122 relative to the winding 121 in accordance with the current request. Thus, the supply current adjustment device 131 changes the magnetic resistance of the magnetic circuit F2 for the winding 121, which passes through the stator core 122. Thus, the supply current adjustment device 131 changes the inductance of the winding 121L. The change of the inductance L leads to a change of the impedance Zg. As a result, a current I to be supplied from the generator 10 is adjusted.

The supply current adjustment device 131 changes the inductance of the winding 121 such that the change rate of the magnetic flux $\Phi$ linked with the winding 121 is lower than the change rate of the inductance of the winding 121L. This is how the supply current adjustment device 131 adjusts the current I. Accordingly, the current is adjusted with less change of the induced voltage E.

Instead of making adjustment by the supply current adjustment device 131, changing the output (rotational power) of the engine 14 is also conceivable as a method for adjusting the current outputted from the generator 10. The engine output adjustment device 141 changes the rotation speed of the engine 14, to change the rotation speed $\omega$ of the rotor 11, so that the voltage to be supplied to the motor 18 is adjusted.

The output (rotational power) of the engine 14 mainly changes the rotation speed of the output shaft C, that is, the rotation speed $\omega$ of the rotor 11. The rotation speed $\omega$ of the rotor 11 influences both the induced voltage E of the winding 121 and the impedance $((\omega L)^2 + R^2)^{1/2}$. Therefore, adoption of only the method of changing the rotation speed of the output shaft C of the engine 14 cannot avoid high interaction between the supply voltage and the supply current.

In this respect, the generator 10 moves the position of the stator core 122 relative to the winding 121 in accordance with the current request, to change the magnetic resistance of the magnetic circuit F2 for the winding 121, which passes through the stator core 122. As a result, the inductance of the winding 121 is changed. Therefore, the ratio of a current change to a voltage change obtained when changing the magnetic resistance of the magnetic circuit F2 for the winding 121 is different from that obtained when changing the rotation speed $\omega$ of the rotor 11. The generator of this embodiment is able to adjust the current to be supplied to the motor 18 with less interaction between the voltage change and the current change as compared with when, for example, only the rotation speed of the output shaft C of the engine 14 is changed by the engine output adjustment device 141.

In this embodiment, a movement of the position of the stator core 122 relative to the winding 121 causes a change of the magnetic resistance of the magnetic circuit F2 for the winding 121. As a result, the inductance of the winding 121L is changed, so that the current is adjusted. This embodiment can gradually change the inductance L because the change of the inductance L is implemented by a change of the magnetic resistance of the magnetic circuit F2 for the winding 121, which passes through the stator core 122.

Instead of changing the magnetic resistance of the magnetic circuit for the winding which passes through the stator core, changing the substantial number of turns of the winding is also conceivable as a method for changing the inductance. For example, it is conceivable that a terminal provided at an end of the winding and a terminal provided in the middle of the winding are selectively switched for use as a current output terminal. It is also conceivable that a terminal provided in the middle of the winding is short-circuited to another terminal. This changes the substantial number of turns which affect the current. As a result, the inductance is changed.

Here, in a case of changing the substantial number of turns of the winding, such a change of the substantial number of turns is caused significantly and instantaneously. Therefore, an excessive voltage occurs in the winding. In addition, an excessive current is likely to flow in a short time. In a case of changing the substantial number of turns, it is required that a switching element for switching the current is provided. Furthermore, the switching element needs to have a high breakdown voltage in order to withstand the excessive voltage. The winding needs to be made of a thick wire in order to deal with a change of the excessive current. For these reasons, changing the substantial number of turns of the winding is less efficient. In addition, it involves a size increase of the generator.

In this embodiment, the magnetic resistance of the stator core 122 is changed, so that the inductance of the winding 121L is changed. Thus, the inductance of the winding 121L can be changed gradually. This can suppress a rapid increase of the voltage occurring in the winding 121. It is therefore possible that a component having a low breakdown voltage is connected to the generator 10. This provides a high efficiency. This also eliminates the need to provide the switching element for switching the current. This also allows use of a relatively thin wire for the winding. A size increase of the generator 10 is suppressed.

Figure 5:
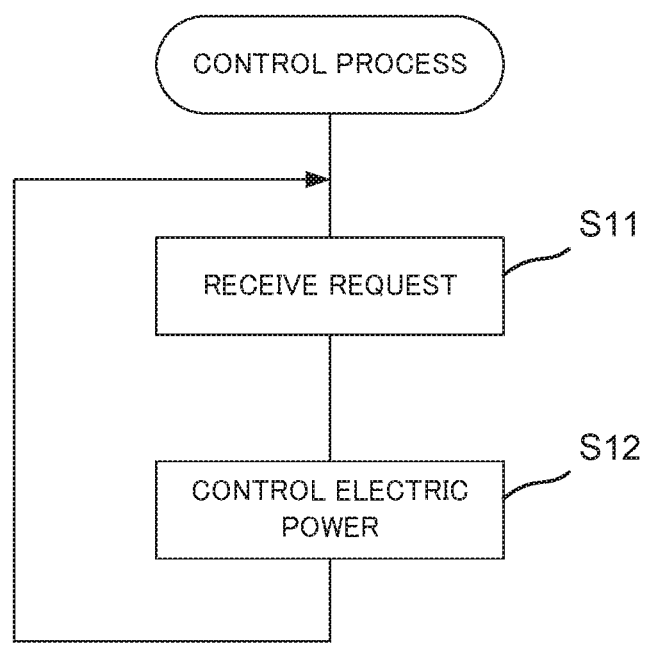
FIG. 5 is a flowchart of an operation of the electric power supply system.

FIG. 5 is a flowchart of the operation of the electric power supply system P.

The electric power supply system P performs a control process. The control device 15 controls the current and voltage to be supplied to the motor 18. The control device 15 repeats the control process shown in FIG. 5. The control of the voltage and current outputted from the electric power supply system P will be described with reference to FIGS. 2 to 3, too.

The current request receiving device 151 of the control device 15 receives a request for electric power (S11). The current request receiving device 151 receives a current request. The current request represents a requirement of the current to be supplied to the motor 18. The current request receiving device 151 receives the amount of operation of the request indication device A. The current request receiving device 151 obtains the current request based on the amount of operation of the request indication device A. More specifically, the current request receiving device 151 obtains the current request based on the amount of operation of the request indication device A, the state of traveling of the vehicle V, setting of the target fuel efficiency, and setting of the followability to the operation.

Then, the adjustment control device 152 controls the current to be supplied to the motor 18 based on the current request received by the current request receiving device 151 (S12). The adjustment control device 152 controls the current to be supplied to the motor 18 based on a request for increasing the current. More specifically, upon a request for increasing the current, the adjustment control device 152 performs the control so as to increase the current to be supplied to the motor 18. The adjustment control device 152 controls the current and voltage to be supplied to the motor 18. The adjustment control device 152 controls the current and voltage to be supplied to the motor 18 based on the amount of operation of the request indication device A.

The adjustment control device 152 is configured to control both the supply current adjustment device 131 and the engine output adjustment device 141. The adjustment control device 152 controls the amount of adjustment made by the supply current adjustment device 131 and the amount of adjustment made by the engine output adjustment device 141. The adjustment control device 152 controls a distribution between the amount of adjustment made by the supply current adjustment device 131 and the amount of adjustment made by the engine output adjustment device 141.

The control device 15 controls a distribution between the amount of increase of the current and the amount of increase of the voltage. As for the control performed by the control device 15, a typical example of a control with a large amount of increase of the voltage and a typical example of a control with a large amount of increase of the current will be described. The typical example of the control with a large amount of increase of the voltage will be referred to as a voltage control. The typical example of the control with a large amount of increase of the current will be referred to as a current control. The control device 15 performs any of the current control, the voltage control, or a combination of the current control and the voltage control, in accordance with the request received.

(Voltage Control)

In the voltage control, the control device 15 directs the engine output adjustment device 141 (see FIG. 2) to increase the rotational power of the engine 14. To be specific, the control device 15 directs the engine output adjustment device 141 to increase the amount of air taken in and the amount of fuel injected by the engine 14. The increase of the power of the engine 14 leads to an increase of the rotation speed of the engine 14 which means the rotation speed $\omega$ of the rotor 11 of the generator 10.

In the voltage control, the control device 15 does not direct the supply current adjustment device 131 to perform the adjustment for reducing the inductance L of the winding 121. The supply current adjustment device 131 maintains the state in which the teeth 122b of the stator core 122 are completely received in the cylindrical shapes of the windings 121, as shown in FIGS. 3A and 3B.

That is, upon a request for increasing the voltage, the control device 15 does not direct the supply current adjustment device 131 to reduce the inductance L of the winding 121. The control device 15 directs the engine output adjustment device 141 to increase the rotational power of the engine 14.

As the rotation speed $\omega$ increases, the induced voltage E of the AC voltage source 121A shown in FIG. 4 increases. The induced voltage E is substantially in proportion to the rotation speed $\omega$. This results in an increase of the voltage outputted from the electric power supply system P. That is, the voltage supplied to the motor 18 increases.

For example, while the motor 18 is rotating at a constant speed according to the voltage that has been already supplied, an induced voltage generated by the rotation occurs in the motor 18. The induced voltage of the motor 18 is generated in such a direction that the current flowing from the electric power supply system P to the motor 18 is impeded. Therefore, the current flowing from the electric power supply system P to the motor 18 is relatively small. That is, impedance Z18 of the motor 18 itself is high. In such a state, the current flowing in the winding 121 of the generator 10 is relatively small. Accordingly, the impedance Zg of the winding 121 is less influential to the output voltage of the electric power supply system P.

As the rotation speed ω increases due to the adjustment made by the engine output adjustment device 141, the impedance Zg of the winding 121 increases. The increase of the impedance Zg of the winding 121 is, however, less influential to the output voltage of the electric power supply system P when the impedance Z18 of the motor 18 is high. Therefore, the voltage supplied to the motor 18 increases substantially in accordance with the increase of the rotation speed ω. The increase of the voltage supplied to the motor 18 leads to an increase of the rotation speed of the motor 18.

(Current Control)

In the current control, the control device 15 directs the supply current adjustment device 131 to adjust the position of the stator core 122 such that the inductance of the winding 121L is reduced. The supply current adjustment device 131 adjusts the position of the stator core 122 so as to increase the magnetic resistance of the magnetic circuit F2 for the winding 121, which passes through the stator core 122. In this embodiment, the supply current adjustment device 131 moves the stator core 122 in such a direction that the teeth 122b of the stator core 122 are moved out of the cylindrical shapes of the windings 121 shown in FIGS. 3A and 3B. As a result, the inductance L of the winding 121 is reduced.

In the electric power supply system P, the control device 15 directs the supply current adjustment device 131 to adjust the magnetic resistance of the magnetic circuit F2 for the winding 121 in accordance with a current request. In this manner, the supply current adjustment device 131 changes the inductance of the winding 121. This is how to control the current to be supplied to the motor 18 serving as the electrical load device.

In the electric power supply system P, for example, the control device 15 directs the supply current adjustment device 131 to increase the magnetic resistance of the magnetic circuit F2 for the winding 121, in accordance with a request for increasing the current. Thus, the supply current adjustment device 131 reduces the inductance of the winding 121. This can increase the current to be supplied to the motor 18 serving as the electrical load device.

The supply current adjustment device 131 changes the inductance of the winding 121 by changing the magnetic resistance of the air gap F2a existing between the winding 121 and the rotor 11. The magnetic pole parts 111 moving along with rotation of the rotor 11 cause an alternating magnetic field to occur between the windings 121 and the rotor 11. For example, reducing the magnetic resistance of the air gap F2a existing between the winding 121 and the rotor 11 leads to a reduction of an alternating magnetic field loss. To be exact, a core loss in the magnetic circuit F2 passing through the air gap F2a is reduced. The reduction of the loss enables a large current to be outputted. Accordingly, the current to be supplied to the motor 18 serving as the electrical load device can be adjusted to an increased degree.

In the current control, the control device 15 directs the engine output adjustment device 141 (FIG. 2) to increase the rotational power of the engine 14. More specifically, the control device 15 directs the engine output adjustment device 141 to increase the amount of air taken in and the amount of fuel injected by the engine 14. The increase of the rotational power of the engine 14 leads to an increase of the rotation speed of the engine 14 which means the rotation speed ω of the rotor 11 of the generator 10.

As the rotation speed ω increases, the induced voltage E of the AC voltage source 121A increases. The induced voltage E is substantially in proportion to the rotation speed ω. The increase of the induced voltage E results in an increase of the current outputted from the electric power supply system P. That is, the current to be supplied to the motor 18 increases.

Figure 9:
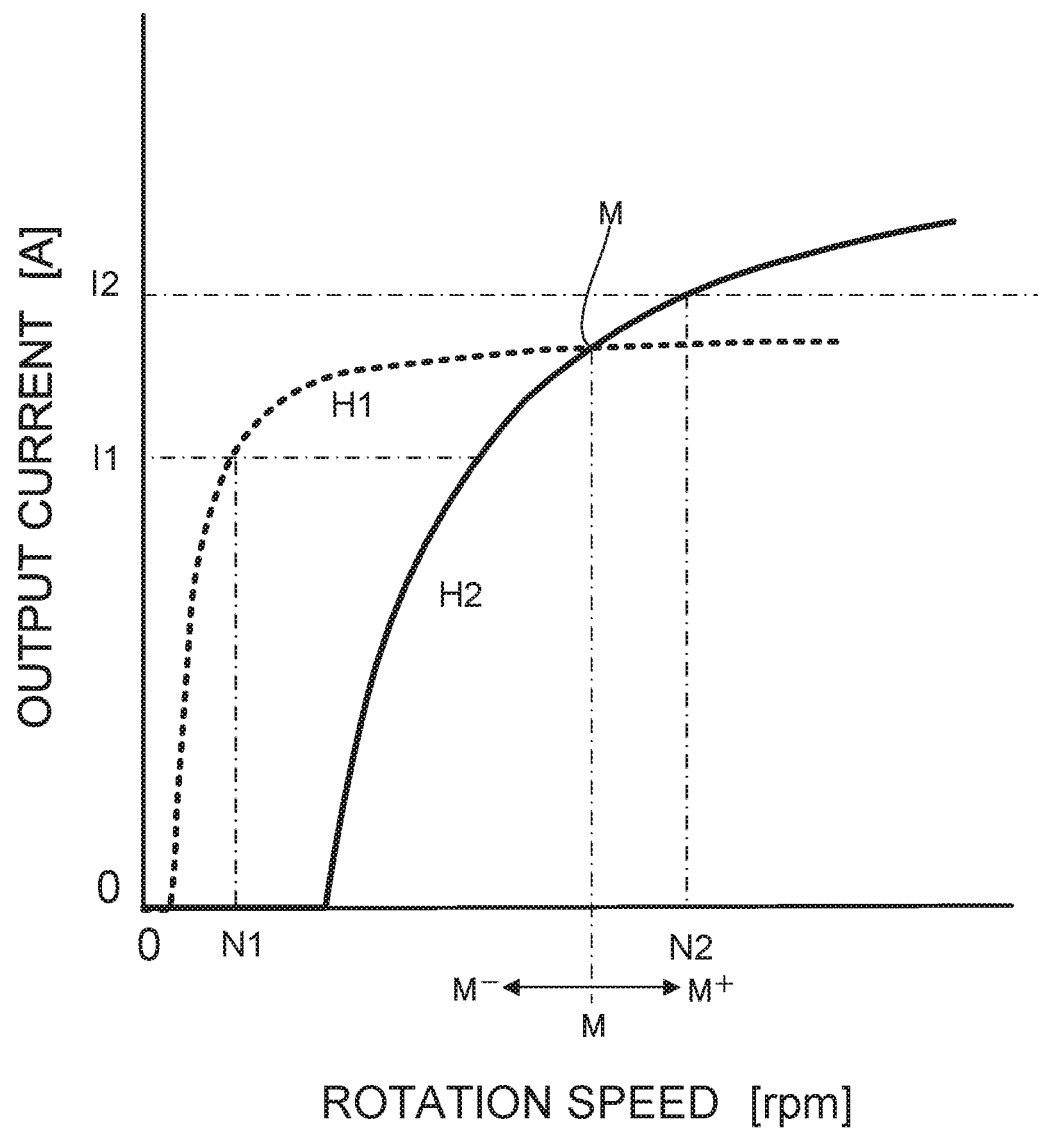
FIG. 9 is a graph showing output current characteristics relative to the rotation speed of a rotor included in the generator shown in FIG. 7.

The control device 15 performs the control by using, for example, a map in which the inductance, the rotation speed, and the output current are stored in association with one another. The map is obtained by, for example, preliminarily measuring or simulating the relationship between the rotation speed and the output current of the engine 14 for a plurality of inductances L. The relationship shown in the graph of FIG. 9 is one example of the relationship between the rotation speed and the output current of the engine 14. In the current control, for example, the control device 15 sets the requested current as a target. For example, the control device 15 controls the engine output adjustment device 141 and the supply current adjustment device 131 so as to obtain the inductance L that enables the target current to be achieved at the minimum rotation speed.

Here, it may be acceptable that the control device 15 is configured to control the engine output adjustment device 141 and the supply current adjustment device 131 by, for example, calculating expressions instead of using the map.

The control device 15 is configured to control both the supply current adjustment device 131 and the engine output adjustment device 141. The control device 15 directs the supply current adjustment device 131 to reduce the inductance of the winding 121 while directing the engine output adjustment device 141 to increase the rotational power of the engine 14.

Preferably, an entire period in which the supply current adjustment device 131 reduces the inductance of the winding 121 has an overlap with an entire period in which the engine output adjustment device 141 increases the rotational power of the engine 14. Preferably, a period in which the supply current adjustment device 131 is reducing the inductance of the winding 121 has an overlap with a period in which the engine output adjustment device 141 is increasing the rotational power of the engine 14.

The rotation speed ω of the rotor 11 of the generator 10 increases due to the adjustment made by the engine output adjustment device 141. On the other hand, the inductance L of the winding 121 is reduced due to the adjustment made by the supply current adjustment device 131. As a result, an increase of the impedance Zg of the winding 121, which depends on the product of the rotation speed ω and the inductance L, is suppressed. Accordingly, a greater increase of the current is obtained as compared with when the inductance of the winding 121L is not reduced.

To respond to a request for an increase of the current, for example, it is conceivable to increase the rotational power of the engine 14 without reducing the inductance L of the winding 121.

In such a case, as the rotational power increases, the rotation speed ω of the rotor increases. The induced voltage E increases accordingly. The increase of the rotation speed ω also increases the impedance Zg of the winding. Therefore, the increase of the current supplied to the motor is smaller than the increase of the rotational power.

Increasing the rotational power of the engine 14 without reducing the inductance L of the winding 121 for the purpose of increasing the current results in an excessive increase of the rotational power of the engine 14 relative to an increase of the power generation current. The excessive increase of the rotational power decreases the fuel efficiency of the engine 14.

In addition, the excessive increase of the rotational power causes an excessive increase of the induced voltage E. For example, in a situation where the rotation speed of the motor 18 becomes substantially constant after responding to the increased current, the current supplied to the motor 18 decreases. This makes the impedance Zg of the winding 121 less influential. Accordingly, a voltage corresponding to the induced voltage E, which has excessively increased, is outputted from the generator 10. Moreover, the converter 16 is arranged between the generator 10 and the motor 18, though not shown in FIG. 4. A high voltage corresponding to the induced voltage E is applied to the switching elements of the converter 16. In general, a switching element having a high breakdown voltage for withstanding a high voltage has a high on-resistance. Thus, a large loss is caused by the switching element.

In this respect, the electric power supply system P of this embodiment is configured such that the supply current adjustment device 131 reduces the inductance L of the winding 121 in response to a request for an increase of the current. As a result, an increase of the impedance Zg of the winding 121 is suppressed. This allows a greater increase of the current to be obtained from the increase of the rotational power of the engine 14 as compared with when, for example, the inductance L is not reduced. In this manner, an excessive increase of the rotational power in response to a request for increasing the current is suppressed. This improves the fuel efficiency of the engine 14. Also, an excessive increase of the output voltage is suppressed. This allows adoption of a switching element with a low breakdown voltage, whose on-resistance is low. Accordingly, a high fuel efficiency is obtained.

The electric power supply system P of this embodiment is able to enhance separation between the adjustment of the current to be supplied to the electrical load device and the adjustment of the voltage to be supplied to the electrical load device. The electric power supply system P is, therefore, able to make adjustment more responsive to each of the current request and the voltage request.

Second Embodiment

Next, a second embodiment of the present invention will be described. In the description of the second embodiment given below, differences from the first embodiment illustrated above will be mainly described.

Figure 6A:
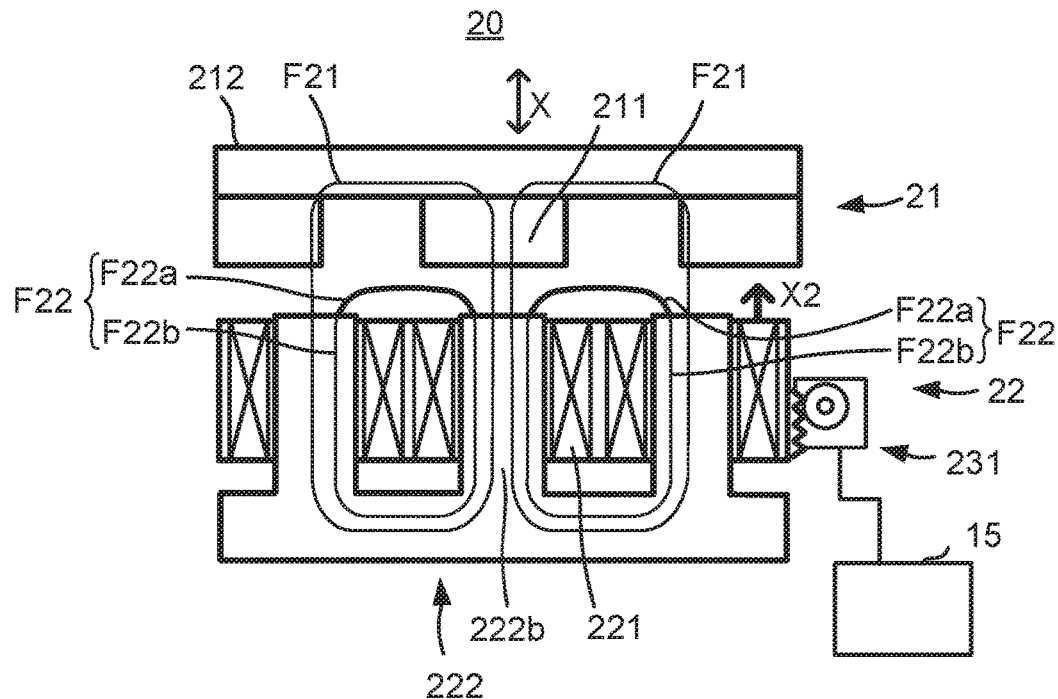
FIG. 6A is a schematic diagram for explanation of adjustment made by a supply current adjustment device included in a generator of an electric power supply system according to a second embodiment.
Figure 6B:
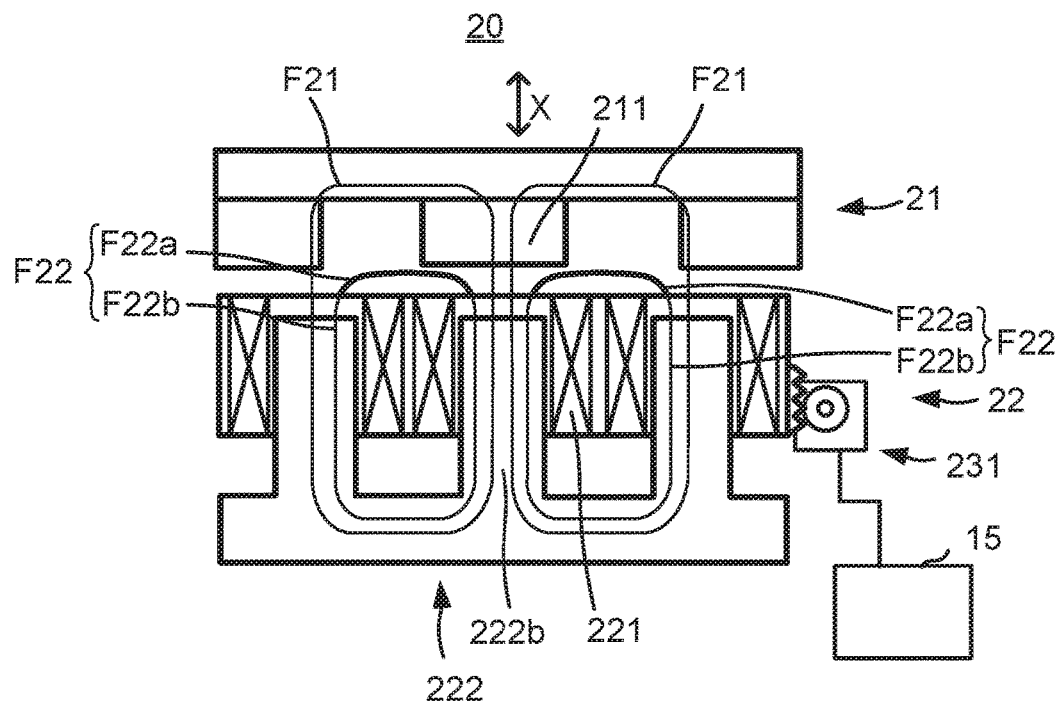
FIG. 6B is a schematic diagram showing a state in which the inductance of a winding is set lower than that of FIG. 6A.

FIG. 6A and FIG. 6B are schematic diagrams for explanation of adjustment made by a supply current adjustment device provided in a generator 20 of an electric power supply system according to the second embodiment. FIG. 6A shows a state in which the inductance of a winding 221 is set to the highest settable value. FIG. 6B shows a state in which the inductance of the winding 221 is set to a value lower than that of FIG. 6A.

The positional relationship among windings 221, a stator core 222, and a rotor 21 shown in FIG. 6A is the same as the positional relationship thereamong in the first embodiment having been described with reference to FIG. 3A.

A magnetic circuit F21 is a magnetic circuit through which a magnetic flux generated by a magnetic pole part 211 passes. A magnetic circuit F22 is a magnetic circuit for the winding 221. The magnetic circuit F22 for the winding 221 is made up of a path passing through the inside of the winding 221 and providing the minimum magnetic resistance of the entire magnetic circuit F22. The magnetic circuit F22 passes through the stator core 222. The magnetic circuit F22 passes through two adjacent teeth 222*b*.

The magnetic circuit F22 passing through the stator core 222 includes an air gap F22*a*. The air gap F22*a* exists between the winding 221 and the rotor 21. The air gap F22*a* included in the magnetic circuit F22 exists between the winding 221 and the rotor 21 and between the two adjacent teeth 222*b*. The air gap F22*a* included in the magnetic circuit F22 is provided so as to connect respective portions of the two adjacent teeth 222*b* opposite to the rotor 21.

The magnetic circuit F22 for the winding 221 does not pass through a back yoke part 212 of the rotor 21. The magnetic circuit F22 for the winding 221 includes the air gap F22*a* between the two adjacent teeth 122*b*.

In the state shown in FIG. 6A, the air gap F22*a* included in the magnetic circuit F22 has the highest magnetic resistance among portions of the magnetic circuit F22. The air gap F22*a* has a higher magnetic resistance than that of a remaining portion F22*b* of the magnetic circuit F22 other than the air gap F22*a*.

In the generator 20 shown in FIG. 6A, a supply current adjustment device 231 moves the windings 221 in accordance with a current request. Thus, the supply current adjustment device 231 changes the magnetic resistance of the magnetic circuit F22 for the winding 221. Thus, the supply current adjustment device 231 changes the inductance of the winding 221, to adjust the current to be supplied to the motor 18 (see FIG. 1).

The supply current adjustment device 231 moves the windings 221 without moving the stator core 222 of the stator 22.

More specifically, the stator core 222 is secured to a casing (not shown). The rotor 21 is rotatably supported on the casing. The rotor 21 is secured with respect to the axial direction X. The windings 221 are supported on the casing such that the windings 221 are freely movable in the axial direction X relative to the casing.

The supply current adjustment device 231 moves the windings 221 in the direction that causes the teeth 222*b* to move into and out of the cylindrical shapes of the windings 221. In this embodiment, the supply current adjustment device 231 moves the windings 221 in the axial direction X. The supply current adjustment device 231 moves the windings 221 in a direction indicated by the arrow X2, for example. All the windings 221 wound on the teeth 222*b* provided in the generator 20 are moved integrally. The control device 15 operates the supply current adjustment device 231 in accordance with the current request.

FIG. 6B shows a state having a lower inductance than that of the state shown in FIG. 6A. The state shown in FIG. 6B is a state after the windings 221 are moved in the direction of the arrow X2.

In this embodiment, the supply current adjustment device 231 moves the windings 221 alone, in accordance with the current request. In this manner, the supply current adjustment device 231 moves the position of the stator core 222 relative to the windings 221. Thus, the supply current adjustment device 231 changes the magnetic resistance of the magnetic circuit F22 for the winding 221, which passes through the stator core 222.

For example, when the windings 221 are moved in the direction of the arrow X2, that is, toward the rotor 21, the teeth 222*b* of the stator core 222 are pulled out of the windings 221. Pulling the teeth 222*b* out of the windings 221 reduces the volume of the stator core 222 existing within the windings 221. As a result, the length of the air gap F22*a* included in the magnetic circuit F22 for the winding 221 increases. This increases the magnetic resistance of the air gap F22*a* between the winding 221 and the rotor 21. That is, the magnetic resistance of the air gap F22a, which has the highest magnetic resistance, is increased. As a result, the magnetic resistance of the magnetic circuit F22 for the winding 221 increases. Consequently, the inductance of the winding 221 decreases.

The supply current adjustment device 231 changes the magnetic resistance of the air gap F22a whose magnetic resistance is highest. Thus, the supply current adjustment device 231 changes the magnetic resistance of the magnetic circuit F22 passing through the adjacent teeth 222b. Accordingly, a larger change of the inductance of the winding 221 is likely to occur as compared with, for example, changing the magnetic resistance of the portion F22b other than the air gap F22a.

In this manner, the supply current adjustment device 231 changes the magnetic resistance of the magnetic circuit F22 for the winding 221. Thus, the supply current adjustment device 231 changes the inductance of the winding 221.

For example, the supply current adjustment device 231 increases the magnetic resistance of the magnetic circuit F22 for the winding 221 in accordance with a request for increasing the current. Thus, the supply current adjustment device 231 reduces the inductance of the winding 221. As a result, the current to be supplied to the motor 18 (see FIG. 1) serving as the electrical load device can be increased.

The supply current adjustment device 231 changes the inductance of the winding 221 by changing the magnetic resistance of the air gap F22a existing between the winding 221 and the rotor 21. This results in a reduction of an alternating magnetic field loss. Accordingly, the current to be supplied to the motor 18 serving as the electrical load device can be adjusted to an increased degree.

Third Embodiment

Next, a third embodiment of the present invention will be described. In the description of the third embodiment given below, differences from the first embodiment illustrated above will be mainly described.

Figure 7:
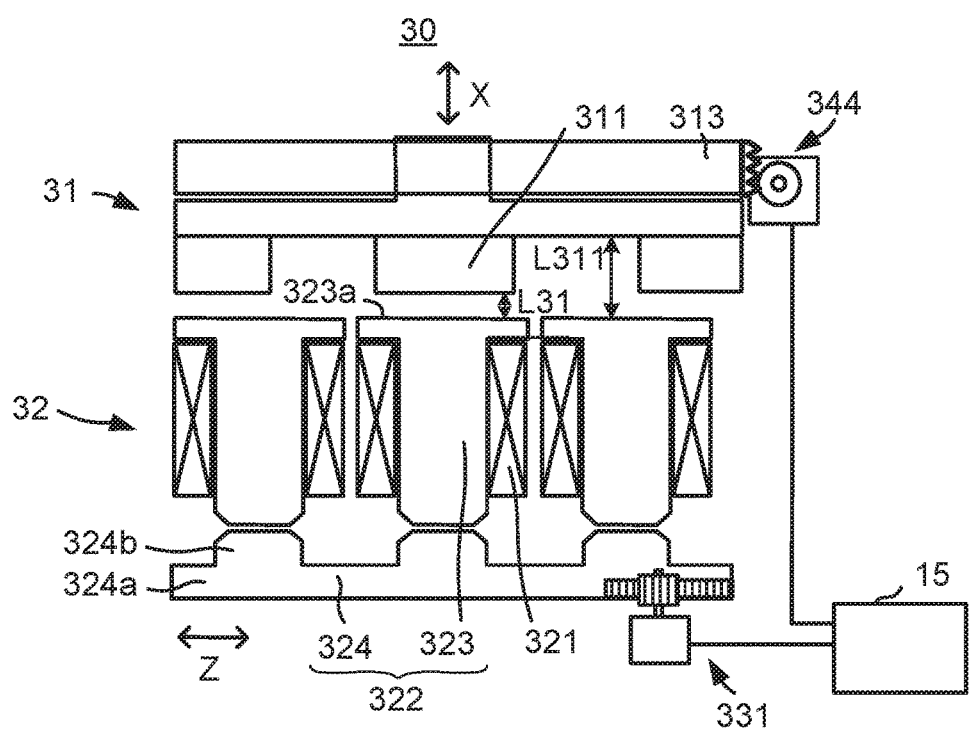
FIG. 7 is a schematic diagram showing a generator of an electric power supply system according to a third embodiment.

FIG. 7 is a schematic diagram showing a generator 30 of an electric power supply system according to the third embodiment.

A stator core 322 provided in the generator 30 shown in FIG. 7 includes a plurality of first stator core parts 323 and a second stator core part 324.

Each of the plurality of first stator core parts 323 is provided with a facing portion 323a that is opposite to the rotor 31 with an air gap therebetween. The plurality of first stator core parts 323 are annularly arranged at intervals. That is, the plurality of first stator core parts 323 align in the circumferential direction Z. The plurality of first stator core parts 323 function as primary teeth in the stator 32. In the specification herein, the first stator core parts 323 may also be referred to as first teeth 323. The length of the facing portion 323a of the first stator core part 323 with respect to the circumferential direction Z is longer than the length of any portion of the first stator core part 323 other than the facing portion 323a with respect to the circumferential direction Z. A winding 321 is wound on each of the first stator core parts 323.

The second stator core part 324 is arranged at a position opposite to the rotor 31 across the first stator core parts 323. The first stator core parts 323 are arranged between the second stator core part 324 and the rotor 31. The second stator core part 324 is not provided with the facing portion 323a that is opposite to the rotor 31. The second stator core part 324 includes a stator yoke portion 324a having an annular shape and a plurality of second teeth 324b. The second teeth 324b protrude from the stator yoke portion 324a and toward the first stator core part 323. The number of the second teeth 324b is equal to the number of the first stator core parts 323. The stator yoke portion 324a and the second teeth 324b may be configured such that substantially all of the magnetic fluxes passing through the second teeth 324b flow through the stator yoke portion 324a. That is, the second teeth 324b may be formed integral with the stator yoke portion 324a. Alternatively, the second teeth 324b may be formed separate from the stator yoke portion 324a such that they are attachable to the stator yoke portion 324a. The second teeth 324b are arranged so as to align in the circumferential direction Z. The plurality of second teeth 324b are annularly arranged at intervals equal to the intervals of the first stator core parts 323.

A supply current adjustment device 331 of the generator 30 of this embodiment moves the position of a part of the stator core 322 relative to the winding 321. The supply current adjustment device 331 moves one of the plurality of first stator core parts 323 and the second stator core part 324 relative to the other. In this manner, the supply current adjustment device 331 changes the magnetic resistance for the winding 321. This is how the supply current adjustment device 331 adjusts the current to be supplied to the motor 18.

In more detail, the first stator core parts 323 are secured to a casing (not shown). The second stator core part 324 is supported so as to be rotatable in the circumferential direction Z. The supply current adjustment device 331 rotates the second stator core part 324 in the circumferential direction Z about the rotation axis of the rotor 31. In this manner, the supply current adjustment device 331 moves the second stator core part 324 from a first state (see FIG. 8A) to a second state (see FIG. 8B).

Figure 8A:
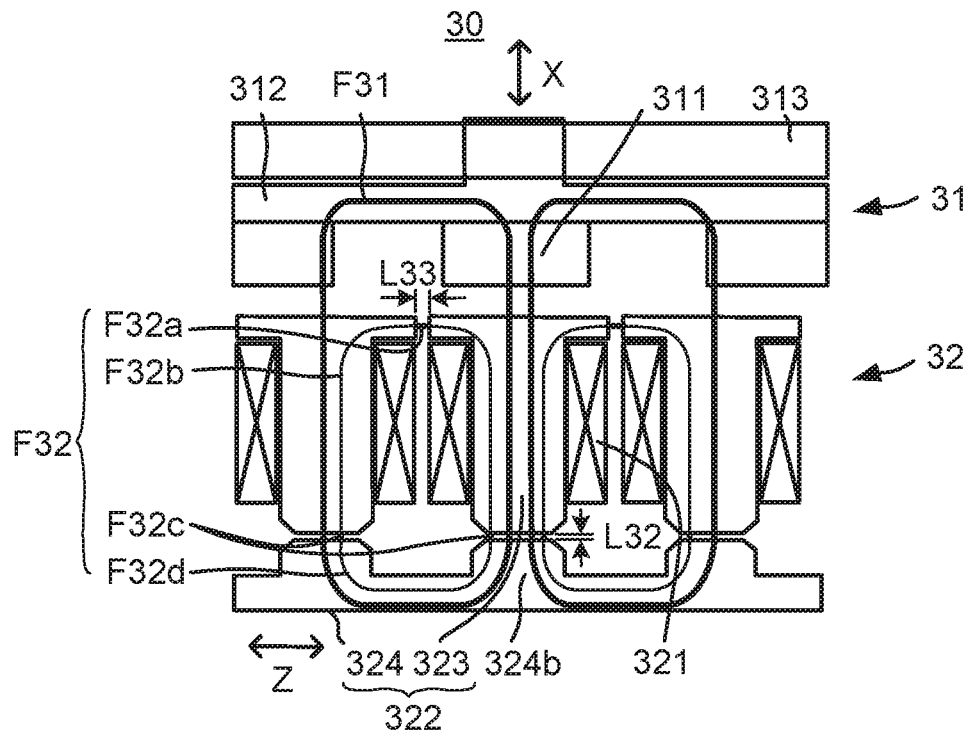
FIG. 8A is a schematic diagram showing a first state of a stator shown in FIG. 7.
Figure 8B:
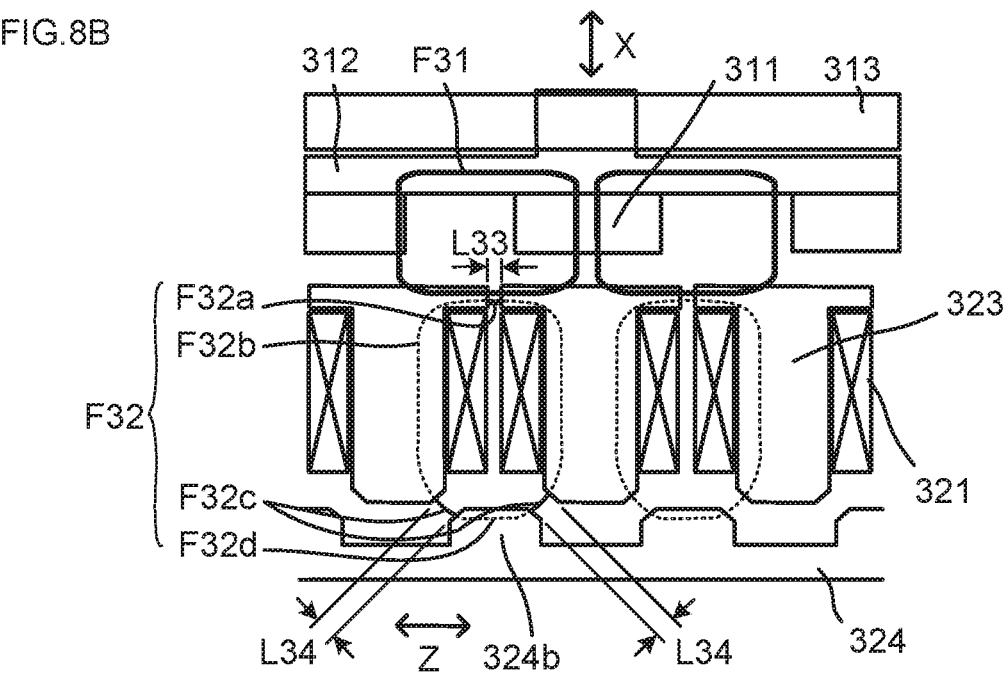
FIG. 8B is a schematic diagram showing a second state of the stator shown in FIG. 7.

FIG. 8A is a schematic diagram showing that the stator 32 illustrated in FIG. 7 is in the first state. FIG. 8B is a schematic diagram showing that the stator 32 illustrated in FIG. 7 is in the second state.

In the state shown in FIG. 8A, the inductance of the winding 321 is set to the highest settable value. In the state shown in FIG. 8B, the inductance of the winding 321 is set to a value lower than that of FIG. 8A.

In the first state shown in FIG. 8A, each of the plurality of second teeth 324b is positioned with respect to the circumferential direction Z so as to confront each of the plurality of first stator core parts 323. In the first state, an air gap length L32 between each of the plurality of first stator core parts 323 and the second stator core part 324 is shorter than an air gap length L33 between adjacent ones of the plurality of first stator core parts 323. To be exact, the air gap length L33 is the length of an air gap formed between respective portions of the first stator core parts 323, each of the portions arranged between the winding 321 and the rotor 31 with respect to a direction in which the rotor 31 and the stator 32 are opposite to each other.

In the second state shown in FIG. 8B, each of the plurality of second teeth 324b is positioned between adjacent ones of the first stator core parts 323 with respect to the circumferential direction Z. In the second state, an air gap length L34 between each of the plurality of first stator core parts 323 and the second stator core part 324 is longer than the air gap length L33 between adjacent ones of the plurality of first stator core parts 323.

Adjustment made by the supply current adjustment device 331 of the generator 30 according to the third embodiment will be described.

FIG. 8A and FIG. 8B illustrate a magnetic circuit F31 through which a magnetic flux generated by a magnetic pole part 311 passes, and a magnetic circuit F32 for the winding 321. The magnetic circuit F32 for the winding 321 is made up of a path passing through the inside of the winding 321 and providing the minimum magnetic resistance of the entire magnetic circuit F32. The magnetic circuit F32 passes through the stator core 322. The magnetic circuit F32 passes through two adjacent first stator core parts 323 (first teeth 323).

The magnetic circuit F32 includes three air gaps. A portion of the magnetic circuit F32 corresponding to an air gap between the two adjacent first stator core parts 323 (first teeth 323) will be referred to as an air gap F32a. Portions of the magnetic circuit F32 corresponding to air gaps each between each of the two adjacent first stator core parts 323 (first teeth 323) and the second stator core part 324 will be referred to as air gaps F32c. The air gap F32a between the two adjacent first stator core parts 323 (first teeth 323) exists between the winding 321 and the rotor 31. The air gap F32a included in the magnetic circuit F32 exists between the winding 321 and the rotor 31 and between the two adjacent first stator core parts 323 (first teeth 323). The air gap F32a is provided so as to connect mutually opposite end surfaces of the respective two adjacent first stator core parts 323 (first teeth 323).

In the first state shown in FIG. 8A, the air gap length L32 between each of the plurality of first stator core parts 323 (first teeth 323) and the second stator core part 324 is shorter than the air gap length L33 between adjacent ones of the plurality of first stator core parts 323 (first teeth 323). The air gap length L33 is the largest air gap length in the magnetic circuit F32. In the first state, therefore, the air gap F32a between the adjacent first stator core parts 323 has the highest magnetic resistance among portions of the magnetic circuit F32 for the winding 321. The magnetic resistance of the air gap F32a is higher than the magnetic resistance of any of remaining portions F32b, F32c, and F32d of the magnetic circuit F32 other than the air gap F32a. The magnetic resistance of the air gap F32a is higher than the magnetic resistance of the air gap F32c between the first stator core part 323 and the second stator core part 324.

A magnetic flux F32 generated by the current in the winding 321 flows through the adjacent first stator core parts 323 and the second stator core part 324, as shown in FIG. 8A. The magnetic resistance of the magnetic circuit F32 for the winding 321, which passes through the stator core 322, depends on the air gap length L33 between the adjacent first stator core parts 323. The air gap length L33 is the largest air gap length in the magnetic circuit F32.

The magnetic flux F31 generated by the magnetic pole part 311 passes through the two adjacent first stator core parts 323. In more detail, the magnetic flux F31 passes through one magnetic pole part 311, a gap between the magnetic pole part 311 and the first stator core part 323, the first stator core part 323, the second stator core part 324, an adjacent first stator core part 323, a gap between the first stator core part 323 and the magnetic pole part 311, an adjacent magnetic pole part 311, and the back yoke part 312. In the first state shown in FIG. 8A, the magnetic circuit F31 for the magnetic pole part 311 passes through the two adjacent first stator core parts 323 and the second stator core part 324.

In the second state shown in FIG. 8B, the air gap length L34 between each of the plurality of first stator core parts 323 and the second stator core part 324 is longer than the air gap length L33 between adjacent ones of the plurality of first stator core parts 323. Therefore, the magnetic resistance of the magnetic circuit F32 for the winding 321, which passes through the stator core 322, is strongly influenced by the air gap length L34 between the first stator core part 323 and the second stator core part 324. As a result, in the second state, the magnetic resistance of the magnetic circuit F32 for the winding 321 is higher than the magnetic resistance in the first state.

The magnetic flux F31 generated by the magnetic pole part 311 passes through one magnetic pole part 311, the gap between the magnetic pole part 311 and the first stator core part 323, and the first stator core part 323. The magnetic flux F31 flows from the first stator core part 323 directly to the adjacent first stator core part 323. The magnetic flux F31 generated by the magnetic pole part 311 passes through a gap between the two adjacent first stator core parts 323. In the second state, the path of the magnetic flux F31 generated by the magnetic pole part 311 is switched as described above. In the second state, even if the path of the magnetic flux F31 is not switched, at least a portion of the magnetic flux F31 generated by the magnetic pole part 311 is increased, the portion passing through the gap between the two adjacent first stator core parts 323. The increase of the portion of the magnetic flux F31 passing through the gap between the two adjacent first stator core parts 323 leads to a substantial increase of the magnetic resistance of the air gap F32a. This is, in a magnetic sense, equivalent to an increase of the air gap length L33 between the two adjacent first stator core parts 323. Thus, the magnetic resistance of the magnetic circuit F32 including the air gap F32a is further increased. The change rate of the inductance of the winding 321 is higher than the change rate of the magnetic flux that is generated by the magnetic pole part 311 and linked with the winding 321.

As described above, the inductance of the winding 321 is liable to be in reverse proportion to the magnetic resistance for the winding 321. Therefore, the inductance of the winding 321 in the second state is lower than the inductance of the winding 321 in the first state.

The supply current adjustment device 331 moves one of the plurality of first stator core parts 323 and the second stator core part 324 relative to the other so as to shift from the first state (see FIG. 8A) to the second state (see FIG. 8B) in accordance with the request for increasing the current, for example. In this manner, the supply current adjustment device 331 changes the magnetic resistance for the winding 321. Thus, the supply current adjustment device 331 changes the inductance of the winding 321. This is how to adjust the current to be supplied to the motor 18 (see FIG. 1).

The supply current adjustment device 331 changes the magnetic resistance of the air gap F32a. The supply current adjustment device 331 changes the magnetic resistance of the air gap F32a without changing the air gap length L33 between the first stator core parts 323 serving as the adjacent teeth. Thus, the supply current adjustment device 331 changes the magnetic resistance of the magnetic circuit F32 passing through the first stator core parts 323 serving as the adjacent teeth. In the first state, the air gap F32a has the highest magnetic resistance among portions of the magnetic circuit F32. Therefore, a change of the inductance of the winding 321 can be greater than that obtained when, for example, changing the magnetic resistance of portions other than the air gap F32a.

The supply current adjustment device 331 changes the inductance of the winding 321 by changing the magnetic resistance of the air gap F32a existing between the winding 321 and the rotor 31. This results in a reduction of an alternating magnetic field loss. Accordingly, the current to be supplied to the motor 18 serving as the electrical load device can be adjusted to an increased degree.

[Current Characteristics]

FIG. 9 is a graph showing output current characteristics relative to the rotation speed of the rotor 31 of the generator 30 shown in FIG. 7.

In the graph of FIG. 9, the broken line H1 represents the output current characteristics in the first state shown in FIG. 8A. In a case of the generator 30 having the output current characteristics represented by the broken line H1, the generator 30 operates in such a manner that the combination of the output current and the rotation speed locates in a region on or below the broken line H1 in the graph of FIG. 9. The solid line H2 represents the output current characteristics in the second state shown in FIG. 8B. In a case of the generator 30 having the output current characteristics represented by the solid line H2, the generator 30 operates in such a manner that the combination of the output current and the rotation speed locates in a region on or below the solid line H2. Here, the graph of FIG. 9 shows the characteristics obtained when a supply voltage adjustment device 344 (see FIG. 7) is not operated, for describing a current control in an easy-to-understand manner.

The adjustment made in the generator 30 will be described with reference to the graph of FIG. 9.

Focusing on the output current obtained in the first state represented by the broken line H1, the output current increases as the rotation speed increases. The rotation speed of the rotor 31 is, therefore, also usable to adjust the output current of the electric power supply system. The rotation speed of the rotor 31 corresponds to the rotation speed of the output shaft C (see FIG. 2) of the engine 14.

In the first state, the increase of the output current in accordance with the increase of the rotation speed is steep in a region where the rotation speed of the rotor 31 is relatively low. In the first state, the increase of the output current in accordance with the increase of the rotation speed is gentle in a region where the rotation speed is relatively high. That is, the change rate of the output current relative to the change of the rotation speed is low in the region where the rotation speed is relatively high.

For example, if the generator 30 is fixed in the first state, a significant increase of the rotation speed of the rotor 31 is required in order to increase the output current in a region where the change rate of the output current is low relative to the change of the rotation speed.

For example, the vehicle V (see FIG. 1) traveling at a high speed requires a further increase of the output torque of the motor 18 when the vehicle starts uphill traveling or overtakes another vehicle during traveling. A request for an increased current is issued in such a situation.

If the request for an increased current for achieving further acceleration is issued while the state of the supply current adjustment device 331 is fixed, a further increase of the rotation speed of the rotor 31, which means the rotation speed of the engine 14, is required. That is, an excessive increase of the rotational power of the engine 14 is required in order to increase the output current.

For example, a situation is assumed in which, when the rotation speed is N1 and the output current is I1, a request for an increased current is issued so that the current needs to be increased to I2. In this situation, if the generator 30 is fixed in the first state which corresponds to H1 in the graph, an excessive increase of the rotation speed of the rotor 31 occurs. In other words, an excessive increase of the rotation speed of the engine 14 occurs. This decreases the fuel efficiency of the engine 14 itself.

The induced voltage of the winding 321 is substantially in proportion to the rotation speed of the rotor 31. A significant increase of the rotation speed causes a significant increase of the induced voltage. To withstand the significant increase of the voltage, electrical components need to have a high breakdown voltage. This leads to a decrease in efficiency due to an increased breakdown voltage of the electrical components.

In the current control, the control device 15 controls the supply current adjustment device 331 (see FIGS. 6A and 6B) in addition to the engine output adjustment device 141 (see FIG. 2). In this manner, the control device 15 changes the magnetic resistance of the magnetic circuit F32 for the winding 321 in accordance with the current request. Thus, the control device 15 changes the inductance of the winding 321. This is how to adjust the current to be supplied to the motor 18. To be more specific, the supply current adjustment device 331 moves the second stator core part 324 from the first state (see FIG. 8A) to the second state (see FIG. 8B). As a result, the output current characteristics change from the one represented by the broken line H1 to the one represented by the solid line H2 in FIG. 9.

The control device 15 reduces the inductance while increasing the rotation speed of the engine 14 to N2. This increases the output current to I2.

In the current control, the control device 15 controls the adjustment made by the engine output adjustment device 141 and the adjustment made by the supply current adjustment device 331 in an integrated manner. The control device 15 controls the engine output adjustment device 141 and the supply current adjustment device 331 as follows. The supply current adjustment device 331 starts a process of reducing the inductance of the winding 121 before the engine output adjustment device 141 terminates a process of increasing the rotational power of the engine 14. That is, there is an overlap between a period in which the supply current adjustment device 331 is reducing the inductance of the winding 121 and a period in which the engine output adjustment device 141 is increasing the rotational power of the engine 14.

Accordingly, the control performed by the control device 15 is able to provide a smooth increase of the current supplied from the electric power supply system P to the motor 18. In addition, occurrence of a situation can be suppressed in which the rotational power of the engine 14 excessively increases before the output current of the generator 30 reaches a requested current value in the process of adjusting the rotational power.

A voltage control performed by the control device 15 will be described. Upon a request for increasing the voltage, the control device 15 does not reduce the inductance L. The control device 15 directs the engine output adjustment device 141 (see FIG. 2) to increase the rotational power of the engine 14 without directing the supply current adjustment device 331 to reduce the inductance L of the winding 321.

In this embodiment, the control device 15 directs the engine output adjustment device 141 to increase the rotational power of the engine 14, while maintaining the supply current adjustment device 331 (see FIG. 7) in the first state (see FIG. 8A) which corresponds to the broken line H1 in the graph of FIG. 9.

The induced voltage E (see FIG. 4) generated in the generator 30 is substantially in proportion to the rotation speed ω. In particular, a situation requesting an increase of the voltage generally occurs when impedance Zm of the motor 18 itself is high. In such a state, the impedance Zg of the winding 321 is less influential to the output voltage of the electric power supply system P. Therefore, a voltage according to the induced voltage E is outputted from the electric power supply system P.

The electric power supply system P is able to respond to a request for increasing the voltage, without directing the supply current adjustment device 331 to reduce the inductance L of the winding 321.

In order that, instead of the electric power supply system P of this embodiment, a commonly-used generator that is unable to change the inductance can provide output current characteristics as represented by the solid line H2 of FIG. 9, it is necessary to increase the thickness of the winding or the amount of magnets. Increasing the thickness of the winding or the amount of magnets leads to a size increase of the electric power supply system itself. As a result, the mountability to vehicle and the portability of the electric power supply system P are deteriorated. If a commonly-used generator that is unable to change the inductance is configured so as to provide output current characteristics as represented by the solid line H2, such generator cannot provide output current characteristics as represented by the broken line H1.

As a method for adjusting the current to be supplied to the motor 18, for example, use of a DC-DC converter is conceivable. A DC-DC converter configured to input and output electric power capable of driving the vehicle V, however, cannot avoid a size increase of its component such as a built-in transformer in response to an increase of required electric power.

In the electric power supply system of this embodiment, the control device 15 controls the supply current adjustment device 331 so as to change the magnetic resistance of the magnetic circuit F32 for the winding 321 in accordance with the current request. Thus, the control device 15 changes the inductance of the winding 321. This enables the control device 15 to adjust the current in accordance with the current request without increasing the thickness of the winding or the amount of magnets.

Referring to FIG. 7 again, the supply voltage adjustment device 344 of the generator 30 will be described.

The generator 30 includes the supply voltage adjustment device 344 in addition to the supply current adjustment device 331. The supply voltage adjustment device 344 is under control of the control device 15.

The supply voltage adjustment device 344 changes a linkage flux that is outputted from the magnetic pole part 311 of the rotor 31 and linked with the winding 321. In this manner, the supply voltage adjustment device 344 changes the induced voltage of the winding 321. This is how the supply voltage adjustment device 344 adjusts the voltage to be supplied to the motor 18. To be specific, the supply voltage adjustment device 344 moves the rotor 31 in the axial direction X. Thus, the supply voltage adjustment device 344 changes an air gap length L31 between the rotor 31 and the stator 32. Such a movement of the rotor 31 in the axial direction X is implemented by, for example, the supply voltage adjustment device 344 configured to move a bearing part 313 in the axial direction X, the bearing part 313 supporting the rotor 31 in a rotatable manner. The change of the air gap length L31 between the rotor 31 and the stator 32 leads to a change of the magnetic resistance between the rotor 31 and the stator 32. As a result, the amount of the magnetic flux generated by the magnetic pole part 311 and linked with the winding 321 is changed. The voltage generated by the generator 30 is changed accordingly.

As thus far described, the electric power supply system of this embodiment is able to adjust the voltage to be supplied to the motor 18 in a way other than by the engine output adjustment device 141 adjusting the rotational power of the engine 14. This provides an increased degree of freedom in terms of controlling, with suppression of a decrease in fuel efficiency.

The supply voltage adjustment device 344 is capable of more reduction of a variation in the linkage flux linked with the winding 321, the variation caused by an operation of the supply current adjustment device 331, the more reduction achieved in the following manner.

The linkage flux that is outputted from the magnetic pole part 311 of the rotor 31 and linked with the winding 321 flows through the stator core 322. Specifically, the linkage flux that is outputted from the magnetic pole part 311 and linked with the winding 321 flows through the first stator core part 323 and the second stator core part 324.

In response to the supply current adjustment device 331 moving the second stator core part 324 so as to shift from the first state (see FIG. 8A) to the second state (see FIG. 8B), the air gap length L32, L34 between the first stator core part 323 and the second stator core part 324 is changed. As a result, the amount of the linkage flux that is outputted from the magnetic pole part 311 of the rotor 31 and linked with the winding 321 is changed.

The supply voltage adjustment device 344 changes the air gap length L31 between the rotor 31 and the stator 32 so as to compensate for a variation in the linkage flux linked with the winding 321, the variation caused by the operation of the supply current adjustment device 33. This can reduce the variation in the linkage flux linked with the winding 321, the variation caused by the operation of the supply current adjustment device 331.

The supply current adjustment device 331, in combination with the compensation made by the supply voltage adjustment device 344, is able to adjust the current while less influenced by voltage constraints.

In the third embodiment described above, the generator 30 includes both the supply current adjustment device 331 and the supply voltage adjustment device 344. The supply voltage adjustment device, however, is not indispensable in the electric power supply system of the present invention.

The third embodiment described above with reference to the current characteristics graph of FIG. 9 illustrates that the current to be supplied to the motor 18 can be adjusted while controlling the inductance. Here, it is to be noted that in the first embodiment and the second embodiment as well, the current to be supplied to the motor 18 can be adjusted while controlling the inductance.

The first stator core part 323, which is illustrated as an example of the first stator core part in the third embodiment above, has, in its end portion opposite to the rotor, protruding portions protruding in the circumferential direction Z which means the direction in which the first stator core parts are arranged side by side. It is however not always necessary that first stator core part of the present invention includes the protruding portions.

In the embodiments described above, the rotor and the stator having an axial gap structure are illustrated as an example. The electric power supply system of the present invention is also applicable to a radial gap structure in which a rotor and a stator are opposite to each other with an air gap therebetween with respect to a radial direction. The axial direction X (FIGS. 3A and 3B) defined in the axial gap structure of these embodiments is one example of the direction in which the rotor and the stator of the present invention are opposite to each other. In the radial gap structure, the rotor and the stator are opposite to each other with respect to the radial direction.

In the embodiments described above, the generator including an SPM generator is illustrated as an example. Alternatively, the generator of the present invention may be an IPM (Interior Permanent Magnet) generator.

The air gap illustrated in the embodiments described above is one example of the non-magnetic gap. The non-magnetic gap is a gap made of a single type of a non-magnetic material or a plurality of types of non-magnetic materials. No particular limitation is put on the non-magnetic material. Examples of the non-magnetic material include air, aluminum, and resins. The non-magnetic gap includes at least an air gap.

In the embodiments described above, the configuration in which the rotor 11 is connected directly to the output shaft C of the engine 14 is illustrated as a specific example of the configuration in which the rotor 11 is connected to the engine 14. Here, the output shaft C of the engine 14 and the rotor 11 of the generator 10 may be connected with interposition of a transmission mechanism as typified by a belt, a gear, or a drive shaft.

In the embodiments described above, the control device 15 configured to concurrently control both the engine output adjustment device 141 and the supply current adjustment device 131 for a current control is illustrated as an example of the control device. This, however, is not limiting the present invention. It may be possible that the control device controls the engine output adjustment device and the supply current adjustment device at different timings.

It is not always necessary that the control device controls both the engine output adjustment device and the supply current adjustment device upon each current increase request. Alternatively, there may be instances where the control device controls both the engine output adjustment device and the supply current adjustment device in response to a single current increase request and where the control device controls the engine output adjustment device or the supply current adjustment device in response to a single current increase request. In other words, the control device may be configured to control both the engine output adjustment device and the supply current adjustment device in response to a single current increase request or to control the engine output adjustment device or the supply current adjustment device in response to a single current increase request, depending on at least the contents of the current increase request and/or the status of operation of the electric power supply system. The control device may be configured to, in a case of controlling both the engine output adjustment device and the supply current adjustment device in response to a single current increase request, start the control of at least one of the engine output adjustment device and the supply current adjustment device during a period in which the single current increase request is issued. In such a case, the control device may continue the control of at least one of the engine output adjustment device and the supply current adjustment device after the single current increase request is issued. Here, the current increase request is a request for increasing the current, and it does not include a request for maintaining the increased current. It may be possible that the voltage is changed in accordance with the current control at a time of the current control. It may be possible that the current is changed in accordance with the voltage control at a time of the voltage control.

In the embodiments described above, the control device 15 configured to receive a current request and a voltage request from the request indication device A is illustrated as an example of the control device. This, however, is not limiting the present invention. In a possible example, the control device may be configured to receive a current request from a device that outputs the current request and a voltage request from another device that outputs the voltage request.

In the embodiments described above, the control device 15 configured to perform the current control, the voltage control, and the combination of the current control and the voltage control is illustrated as an example of the control device. The control device, however, may perform the current control and the voltage control alone. Alternatively, the control device may perform the current control alone.

In the embodiments described above, the accelerator operator is illustrated as an example of the request indication device A. Here, the current request of the present invention may not always need to be an output of the accelerator operator. The following is some examples of the request indication device and the current request issued by the request indication device:

a signal of requesting acceleration issued by an automatic speed control device (cruise control) of the vehicle;

an output of a switch and volume different from the accelerator operator, which is operated by the driver; or an output of an operator provided in the electrical load device.

The embodiments described above illustrate the example in which the supply current adjustment device 131 under control of the control device 15 reduces the inductance of the winding 121 by reducing the magnetic resistance of the magnetic circuit F2 for the winding 121 in accordance with the request for increasing the current. It is however not always necessary that the reduction of the magnetic resistance of the magnetic circuit for the winding implemented by the supply current adjustment device of the present invention is in accordance with the request for increasing the current.

The embodiments described above illustrate the example in which the control device configured to receive a signal is provided. Here, the current request issued to the electric power supply system is not limited to an electrical signal. It may be also acceptable that the control device of the present invention is operated by, for example, a wire connected to an operation lever. In such a configuration, the supply current adjustment device may move the stator core by using a force transmitted from the wire.

In the embodiments described above, the engine output adjustment device 141 including the throttle valve adjustment mechanism 141*a* and the fuel injection device 141*b* is illustrated as an example of the engine output adjustment device. It is not always necessary that the engine output adjustment device uses both the throttle valve adjustment mechanism and the fuel injection device for adjustment of the rotational power. For example, the engine output adjustment device may adjust the rotational power by using one of the throttle valve adjustment mechanism and the fuel injection device. The engine output adjustment device of the present invention may be, for example, a valve arrangement that adjusts the flow rate of a gaseous fuel. The engine of the present invention may use a liquid fuel or a gaseous fuel.

In the embodiments described above, the three-phase brushless motor is illustrated as an example of the motor 18. The motor 18 of the present invention may be a motor having the same structure as that of the generator described in this embodiment. For example, like the generator 30, the motor 18 may be structured so as to include the plurality of first stator core parts and the second stator core part and configured to move one of the first stator core part and the second stator core part relative to the other.

In the embodiments described above, the vehicle V including the electric power supply system P that supplies electric power to the motor 18 is illustrated as an example of the vehicle. This, however, is not limiting the vehicle of the present invention. For example, the vehicle may be provided with a battery for storing electric power supplied from an electric power supply system. In addition, the motor of the vehicle may be driven by electric power stored in the battery, for example. Moreover, the motor of the vehicle may be operated by electric power that is supplied concurrently from both the electric power supply system P and the battery, for example.

In the embodiments described above, the vehicle V having four wheels is illustrated as an example of the apparatus to which the electric power supply system is applied. Applications of the electric power supply system of the present invention, however, are not limited thereto, and it may be applicable to a vehicle with three wheels or less, a vehicle with five wheels or more, and a vehicle with no wheel.

The electric power supply system of the present invention is applicable to, for example, a vehicle including a motor that receives electric power for driving wheels. The electric power supply system of the present invention is applicable to, for example, motorcycles, motor tricycles, buses, trucks, golf carts, carts, ATVs (All-Terrain Vehicles), ROVs (Recreational Off-highway Vehicles), and track-type vehicles.

The electric power supply system of the present invention is applicable to, for example, a vehicle in which a drive mechanism different from wheels is driven by a motor. The electric power supply system of the present invention is applicable to, for example, industrial vehicles typified by forklifts, snow blowers, agricultural vehicles, military vehicles, snowmobiles, construction machines, small planing boats (water vehicles), marine crafts, outboard engines, inboard engines, airplanes, and helicopters.

The electric power supply system of the present invention is applicable to, for example, engine blowers, snow blowers, lawn mowers, agricultural implements, gas engine heat pumps, and general-purpose machines.

The electric power supply system of the present invention is applicable to general-purpose engine generator apparatuses.

In the embodiments described above, an exemplary engine generator device is illustrated as an example of the electric power supply system. The present invention, however, is not limited to a single device. For example, the electric power supply system may be structured such that individual component parts are separately mounted to an apparatus.

In the embodiments described above, the engine generator device P' including the fuel tank 10A, the air cleaner 10B, and the muffler 10D is illustrated as an example of the engine generator device. This, however, is not limiting the engine generator device of the present invention. For example, it may be acceptable that a fuel tank, an air cleaner, and a muffler are provided not in the engine generator device but in the vehicle body of the vehicle V. That is, it suffices that the engine of the present invention includes at least a cylinder for fuel combustion to output rotational power, a piston, and an output shaft. The engine of the present invention does not include a fuel tank, an air cleaner, and a muffler.

In the embodiments described above, the control device 15 constituted of a microcontroller is illustrated as an example of the control device. This, however, is not limiting the present invention. The control device may be constituted of a wired logic, for example.

The change of the inductance of the winding is implemented by changing the magnetic resistance of the magnetic circuit for the winding, which passes through the stator core. The change of the magnetic resistance of the magnetic circuit for the winding, which passes through the stator core, may be implemented in a plurality of stages or in a single stage, or may be implemented continuously. In other words, the output current characteristics of the generator may be changed in a plurality of stages or in a single stage, or may be changed continuously. The broken line H1 of FIG. 9 represents exemplary output current characteristics obtained when the magnetic resistance of the magnetic circuit for the winding, which passes through the stator core, is low. The solid line H2 of FIG. 9 represents exemplary output current characteristics obtained when the magnetic resistance of the magnetic circuit for the winding, which passes through the stator core, is high. That is, the output current characteristics of the generator shown in FIG. 9 are not to be interpreted as limiting the change of the magnetic resistance of the magnetic circuit for the winding, which passes through the stator core, to a two-stage change as illustrated in this embodiment. The output current characteristics represented by the broken line H1 and the solid line H2 of FIG. 9 are contained in the output current characteristics that are changed in a plurality of stages, in a single stage, or continuously. In the present invention, the magnetic resistance of the magnetic circuit for the winding, which passes through the stator core, may be changed in two stages.

A situation where the supply current adjustment device changes the state of the generator from one of a high-resistance state and a low-resistance state to the other will be descried. In the low-resistance state, the magnetic resistance of the magnetic circuit for the winding, which passes through the stator core, is lower than that in the high-resistance state. For example, in a case where the state of the generator is changed so as to increase the magnetic resistance of the magnetic circuit for the winding, which passes through the stator core; the state of the generator before the change is the low-resistance state and the state of the generator after the change is the high-resistance state. In a case where the state of the generator is changed so as to reduce the magnetic resistance of the magnetic circuit for the winding, which passes through the stator core; the state of the generator before the change is the high-resistance state and the state of the generator after the change is the low-resistance state. Thus, no particular limitation is put on the absolute value of the magnetic resistance of the magnetic circuit for the winding, which passes through the stator core, in each of the high-resistance state and the low-resistance state. The high-resistance state and the low-resistance state are defined in a relative sense. The inductance of the winding in the high-resistance state is lower than the inductance of the winding in the low-resistance state.

In an example described below, exemplary output current characteristics of the generator in the low-resistance state correspond to the broken line H1 of FIG. 9, and exemplary output current characteristics of the generator in the high-resistance state correspond to the solid line H2 of FIG. 9. At the rotation speed (M) corresponding to the intersection M between the broken line H1 and the solid line H2, the generator in the high-resistance state and the generator in the low-resistance state output an equal magnitude of current at the equal rotation speed (M). That is, output current characteristic curves (H1, H2) of the generator obtained before and after the change of the magnetic resistance of the magnetic circuit for the winding, which passes through the stator core, have the intersection therebetween, and there is the rotation speed (M) corresponding to this intersection. Here, an output current characteristic curve means a curve representing the output current of the generator relative to the rotation speed of the rotor.

As shown in FIG. 9, the generator of the present invention is configured such that, in a case where the supply current adjustment device changes the state of the generator from the low-resistance state to the high-resistance state, the generator in the high-resistance state (H2) is able to output a current (I2) when rotating at a rotation speed (M+) higher than the rotation speed (M), the current (I2) being larger than the maximum current that could be outputted by the generator in the low-resistance state (H1) rotating at the rotation speed (M+). In the generator of the present invention, the state of the generator is changed so as to increase the magnetic resistance of the magnetic circuit for the winding, which passes through the stator core, thus enabling the generator to output a large current that could not be outputted at a relatively high rotation speed before the change.

As shown in FIG. 9, the generator of the present invention is configured such that, in a case where the supply current adjustment device changes the state of the generator from the high-resistance state to the low-resistance state, the generator in the low-resistance state (H1) is able to output a current when rotating at a rotation speed (M−) lower than the rotation speed (M), the current being larger than the maximum current that could be outputted by the generator in the high-resistance state (H2) rotating at the rotation speed (M−). In the generator of the present invention, the state of the generator is changed so as to reduce the magnetic resistance of the magnetic circuit for the winding, which passes through the stator core, thus enabling the generator to output a large current that could not be outputted at a relatively low rotation speed before the change.

As thus far described, the generator of the present invention is configured such that the generator after the supply current adjustment device changes the magnetic resistance of the magnetic circuit for the winding, which passes through the stator core, is able to output a current at the rotation speed (M− or M+) higher or lower than the rotation speed (M), the current being larger than the maximum current that the generator could output at the rotation speed (M− or M+) before the change.

It should be understood that the terms and expressions used in the embodiments above are for descriptions and have no intention to be construed in a limited manner, do not eliminate any equivalents of features shown and mentioned herein, and allow various modifications falling within the claimed scope of the present invention. The present invention may be embodied in many different forms. The present disclosure is to be considered as providing examples of the principles of the invention. A number of illustrative embodiments are described herein with the understanding that such examples are not intended to limit the invention to preferred embodiments described herein and/or illustrated herein. The embodiments described herein are not limiting. The present invention includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to examples described in the present specification or during the prosecution of the application. The present invention should be interpreted broadly based on the language employed in the claims.

REFERENCE SIGNS LIST

P electric power supply system
P' engine generator device
10, 20, 30 generator
11, 21, 31 rotor
12, 22, 32 stator
14 engine
15 control device
17a connector
131, 231, 331 supply current adjustment unit
141 engine output adjustment unit
151 current request receiving unit
152 adjustment control unit
323 first stator core part
324 second stator core part
344 supply voltage adjustment unit

The invention claimed is:

1. An electric power supply system configured to supply electric power to an electrical load device in accordance with a current requirement, comprising:
   an engine configured to output rotational power;
   a generator including
      a rotor, including a permanent magnet, configured to receive the rotational power from the engine,
      a stator including a stator core with a winding wound thereon, the rotational power causing the rotor and the stator to generate a current, and
      a supply current adjustment device configured to move at least a portion of the stator core relative to the winding, so as to adjust magnetic resistance of a magnetic circuit for the winding, wherein the magnetic circuit passes through the stator core, to thereby switch between a low-resistance state and a high-resistance state, and to thereby change an inductance of the winding to adjust the current; and
   a control device configured to control the engine to adjust the output rotational power and to control the supply current adjustment device to adjust the inductance of the winding, wherein
   the magnetic circuit for the winding is a circuit in which a magnetic flux occurs from flowing of electric current in the winding,
   for each rotation speed of the rotational power, the current generated by the stator is of a first amount and a second amount when the supply current adjustment device is in the low-resistance state and the high-resistance state, respectively, the first amount being larger than the second amount when said each rotation speed is lower than a threshold, and smaller than the second amount when said each rotation speed is higher than the threshold,
   the control device is configured to control the current adjustment device to, responsive to receipt of the current requirement,
      switch from the low-resistance state to the high-resistance state when a rotation speed of the received rotational power is higher than the threshold, and
      switch from the high-resistance state to the low-resistance state when the rotation speed of the received rotational power is lower than the threshold.

2. The electric power supply system according to claim 1, wherein the magnetic circuit for the winding includes a non-magnetic gap between the winding and the rotor, and the supply current adjustment device changes magnetic resistance of the non-magnetic gap between the winding and the rotor, so as to change the inductance of the winding.

3. The electric power supply system according to claim 1, wherein the magnetic circuit for the winding includes a plurality of non-magnetic gaps, and the supply current adjustment unit changes magnetic resistance of one of the plurality of non-magnetic gaps, the magnetic resistance of the one non-magnetic gap being highest when the inductance of the winding is set to a highest settable value.

4. The electric power supply system according to claim 3, wherein a magnetic flux forms in the rotor and is linked with the winding, the magnetic flux changing, at a first change rate, as the rotor rotates, and the supply current adjustment device adjusts a supply current by changing the inductance of the winding at a second change rate that is higher than the first change rate.

5. The electric power supply system according to claim 4, wherein the supply current adjustment device is controlled by the control device to move the at least a portion of the stator core relative to the winding.

6. The electric power supply system according to claim 3, wherein the supply current adjustment device is controlled by the control device to move the at least a portion of the stator core relative to the winding.

7. The electric power supply system according to claim 2, wherein a magnetic flux forms in the rotor and is linked with the winding, the magnetic flux changing, at a first change rate, as the rotor rotates, and the supply current adjustment device adjusts a supply current by changing the inductance of the winding at a second change rate that is higher than the first change rate.

8. The electric power supply system according to claim 7, wherein the supply current adjustment device is controlled by the control device to move the at least a portion of the stator core relative to the winding.

9. The electric power supply system according to claim 2, wherein the supply current adjustment device is controlled by the control device to move the at least a portion of the stator core relative to the winding.

10. The electric power supply system according to claim 1, wherein a magnetic flux forms in the rotor and is linked with the winding, the magnetic flux changing, at a first change rate, as the rotor rotates, and the supply current adjustment device adjusts a supply current by changing the inductance of the winding at a second change rate that is higher than the first change rate.

11. The electric power supply system according to claim 10, wherein the supply current adjustment device is controlled by the control device to move the at least a portion of the stator core relative to the winding.

12. The electric power supply system according to claim 1, wherein the supply current adjustment device is controlled by the control device to move the at least a portion of the stator core relative to the winding.

13. The electric power supply system according to claim 12, wherein the supply current adjustment device is controlled by the control device to cause the portion of the stator core to move relative to the winding while maintaining a position of the stator core relative to the rotor.

14. The electric power supply system according to claim 1, wherein a linkage flux flows from the permanent magnet of the rotor and is linked with the winding; and the generator further includes a supply voltage adjustment device configured to change the linkage flux to thereby change an induced voltage of the winding, so as to adjust a voltage to be supplied to the electrical load device.

15. The electric power supply system according to 14, wherein the supply voltage adjustment device includes a voltage supply adjustment mechanism configured to change the linkage flux flowing from the permanent magnet of the rotor and linked with the winding by moving the rotor, to thereby change the induced voltage of the winding to adjust the supply voltage.

16. The electric power supply system according to claim 15, wherein the supply voltage adjustment device further includes a voltage adjustment control device, which is one of a circuit, and a processor executing program instructions, configured to control the voltage supply adjustment mechanism to move the rotor in accordance with the current requirement.

17. The electric power supply system according to claim 1, wherein the stator core includes a plurality of first stator core parts, each having a facing portion that is placed opposite to the rotor with a non-magnetic gap therebetween, and a second stator core part, and the supply current adjustment device changes the magnetic resistance of the magnetic circuit for the winding by causing the plurality of first stator core parts and the second stator core part to move relative to each other in accordance with the current requirement.

18. The electric power supply system according to claim 17, wherein the moving of the plurality of first stator core parts and the second stator core part relative to the other causes a state of the stator to shift from a first state in which a width of a non-magnetic gap between each of the plurality of first stator core parts and the second stator core part is smaller than a width of a non-magnetic gap between adjacent ones of the plurality of first stator core parts to a second state in which the width of the non-magnetic gap between each of the plurality of first stator core parts and the second stator core part is larger than the width of the non-magnetic gap between adjacent ones of the plurality of first stator core parts.

19. The electric power supply system according to claim 1, wherein the control device includes one of a circuit and a processor executing program instructions, configured to control the engine to adjust the output rotational power and to control the supply current adjustment device to adjust the inductance of the winding.

20. A vehicle, comprising:

the electric power supply system according to claim 1, wherein the electrical load device is a motor operable by the electric power supplied from the electric power supply system; and a driving member that is driven by the motor, to drive the vehicle.

21. An engine generator device for driving a vehicle including a vehicle connector, comprising:

the electric power supply system according to claim 1; and a connector connectable to the vehicle connector of the vehicle, to relay the current supplied from the generator to the electrical load device, wherein the engine, the generator, and the control device are integrally mounted on the vehicle in a dismountable manner.

22. A vehicle, comprising:
the engine generator device for driving a vehicle according to claim 21;
a storage part that stores the engine generator device;
the vehicle connector connectable to the connector of the engine generator device;
a motor serving as the electrical load device; and
a driving member that is driven by the motor, to drive the vehicle.

23. A control device for use in an electric power supply system that includes
an engine configured to output rotational power, and
a generator configured to receive the rotational power from the engine and to supply a current to an electrical load device, the generator including a rotor connected to the engine, a stator including
a stator core with a winding wound thereon,
a magnetic circuit for the winding passing through the stator core, and
a supply current adjustment device configured to adjust magnetic resistance of the magnetic circuit for the winding, to thereby change an inductance of the winding to adjust the supplied current,
the control device comprising:
one of a circuit and a processor executing program instructions, configured to
receive a current request that represents requirement of a current to be supplied to the electrical load device, and
control the current supplied to the electrical load device by controlling the engine to adjust the output rotational power, and by controlling the supply current adjustment device to move at least a portion of the stator core relative to the winding, so as to switch the supply current adjustment device between a low-resistance state and a high-resistance state, to thereby adjust the inductance of the winding, in accordance with the received current request, wherein
the magnetic circuit for the winding is a circuit in which a magnetic flux occurs, from flowing of electric current in the winding,
for each rotation speed of the rotational power, the current supplied by the generator is of a first amount and a second amount when the supply current adjustment device is in the low-resistance state and the high-resistance state, respectively, the first amount being larger than the second amount when said each rotation speed is lower than a threshold, and smaller than the second amount when said each rotation speed is higher than the threshold, and
the controlling of the supply current adjustment device includes controlling the supply current adjustment device to, responsive to the receipt of the current request,
switch from the low-resistance state to the high-resistance state when a rotation speed of the received rotational power is higher than the threshold, and
switch from the high-resistance state to the low-resistance state when the rotation speed of the received rotational power is lower than the threshold.

* * * * *